US011354906B2

(12) United States Patent
Perazzi et al.

(10) Patent No.: US 11,354,906 B2
(45) Date of Patent: Jun. 7, 2022

(54) TEMPORALLY DISTRIBUTED NEURAL NETWORKS FOR VIDEO SEMANTIC SEGMENTATION

(71) Applicant: Adobe Inc., San Jose, CA (US)

(72) Inventors: Federico Perazzi, San Francisco, CA (US); Zhe Lin, Fremont, CA (US); Ping Hu, Boston, MA (US); Oliver Wang, Seattle, WA (US); Fabian David Caba Heilbron, San Jose, CA (US)

(73) Assignee: Adobe Inc., San Jose, CA (US)

( * ) Notice: Subject to any disclaimer, the term of this patent is extended or adjusted under 35 U.S.C. 154(b) by 130 days.

(21) Appl. No.: 16/846,544

(22) Filed: Apr. 13, 2020

(65) Prior Publication Data

US 2021/0319232 A1 Oct. 14, 2021

(51) Int. Cl.
*G06V 20/40* (2022.01)
*G06N 3/04* (2006.01)
*G06T 7/11* (2017.01)
*G06F 17/15* (2006.01)

(52) U.S. Cl.
CPC .............. *G06V 20/49* (2022.01); *G06F 17/15* (2013.01); *G06N 3/0454* (2013.01); *G06T 7/11* (2017.01); *G06T 2207/10016* (2013.01); *G06T 2207/20084* (2013.01)

(58) Field of Classification Search
CPC combination set(s) only.
See application file for complete search history.

(56) References Cited

U.S. PATENT DOCUMENTS

| 2002/0135618 | A1* | 9/2002 | Maes | G06F 3/0481 |
| | | | | 715/767 |
| 2019/0051056 | A1* | 2/2019 | Chiu | G06V 20/56 |
| 2019/0384985 | A1* | 12/2019 | Tang | G06K 9/6267 |
| 2020/0026928 | A1* | 1/2020 | Rhodes | G06K 9/6271 |

(Continued)

OTHER PUBLICATIONS

Xizhou Zhu,"Deep Feature Flow for Video Recognition," Jul. 2017, Proceedings of the IEEE Conference on Computer Vision and Pattern Recognition (CVPR), 2017, pp. 2350-2355.*

(Continued)

*Primary Examiner* — Omar S Ismail
(74) *Attorney, Agent, or Firm* — Kilpatrick Townsend & Stockton LLP

(57) ABSTRACT

A Video Semantic Segmentation System (VSSS) is disclosed that performs accurate and fast semantic segmentation of videos using a set of temporally distributed neural networks. The VSSS receives as input a video signal comprising a contiguous sequence of temporally-related video frames. The VSSS extracts features from the video frames in the contiguous sequence and based upon the extracted features, selects, from a set of labels, a label to be associated with each pixel of each video frame in the video signal. In certain embodiments, a set of multiple neural networks are used to extract the features to be used for video segmentation and the extraction of features is distributed among the multiple neural networks in the set. A strong feature representation representing the entirety of the features is produced for each video frame in the sequence of video frames by aggregating the output features extracted by the multiple neural networks.

17 Claims, 8 Drawing Sheets

(56) References Cited

U.S. PATENT DOCUMENTS

2020/0134827 A1* 4/2020 Saha .................. G06V 20/20
2020/0160528 A1* 5/2020 Rhodes ................ G06T 7/174

OTHER PUBLICATIONS

Yi Zhu,"Improving Semantic Segmentation via Video Propagation and Label Relaxation," Jun. 2019, Proceedings of the IEEE/CVF Conference on Computer Vision and Pattern Recognition (CVPR), 2019, pp. 8857-8862.*

Samvit Jain,"Accel: A Corrective Fusion Network for Efficient Semantic Segmentation on Video," Jun. 2019, Proceedings of the IEEE/CVF Conference on Computer Vision and Pattern Recognition (CVPR), 2019, pp. 8867-8872.*

Xiaojie Jin,"Video Scene Parsing with Predictive Feature Learning," Oct. 2017, Proceedings of the IEEE International Conference on Computer Vision (ICCV), 2017, pp. 5580-5586.*

Matthew B. Blaschko,"Learning to Localize Objects with Structured Output Regression," European Conference on Computer Vision, ECCV 2008: Computer Vision—ECCV 2008, pp. 2-15.*

David Nilsson,"Semantic Video Segmentation by Gated Recurrent Flow Propagation," Jun. 2018, Proceedings of the IEEE Conference on Computer Vision and Pattern Recognition (CVPR), 2018, pp. 6820-6826.*

Raghudeep Gadde,"Semantic Video CNNs through Representation Warping," Oct. 2018, Proceedings of the IEEE International Conference on Computer Vision (ICCV), 2017, pp. 4454-4460.*

Yang He,"STD2P: RGBD Semantic Segmentation using Spatio-Temporal Data-Driven Pooling," Jul. 2017, Proceedings of the IEEE Conference on Computer Vision and Pattern Recognition (CVPR), 2017, pp. 4838-4843.*

Liang-Chieh Chen,"Encoder-Decoder with Atrous Separable Convolution for Semantic Image Segmentation," Sep. 2018, Proceedings of the European Conference on Computer Vision (ECCV), 2018, pp. 2-14.*

Tong He,"Knowledge Adaptation for Efficient Semantic Segmentation," Jun. 2019, Proceedings of the IEEE/CVF Conference on Computer Vision and Pattern Recognition (CVPR), 2019, pp. 579-583.*

Hengshuang Zhao1,"ICNetfor Real-Time Semantic Segmentation on High-Resolution Images," Sep. 2018, Proceedings of the European Conference on Computer Vision (ECCV), 2018,pp. 2-13.*

Davide Mazzini,"Guided Upsampling Network for Real-Time Semantic Segmentation," Jul. 19, 2018, Computer Vision and Pattern Recognition,pp. 2-9.*

Brostow et al., Segmentation and Recognition Using Structure from Motion Point Clouds, European Conference on Computer Vision, 2008, 15 pages.

Carreira et al., Massively Parallel Video Networks, European Conference on Computer Vision, 2018, pp. 1-27.

Chen et al., Deeplab: Semantic Image Segmentation with Deep Convolutional Nets, Atrous Convolution, and Fully Connected CRFs, IEEE Transactions Pattern Analysis Machine Intelligence, vol. 40, No. 4, May 12, 2017, pp. 1-14.

Chen et al., Encoder-Decoder with Atrous Separable Convolution for Semantic Image Segmentation, Computer Vision—European Conference on Computer Vision, Oct. 6, 2018, 18 pages.

Cordts et al., The Cityscapes Dataset for Semantic Urban Scene Understanding, Proceedings of the IEEE Computer Society Conference on Computer Vision and Pattern Recognition (CVPR), 2016, pp. 1-11.

Deng et al., Imagenet: A Large-Scale Hierarchical Image Database, IEEE Conference on Computer Vision and Pattern Recognition, CVPR, Jun. 2009, pp. 248-255.

Ding et al., Context Contrasted Feature and Gated Multi-Scale Aggregation for Scene Segmentation, In Computer Vision and Pattern Recognition, 2018, pp. 2393-2402.

Dosovitskiy et al., Flownet: Learning Optical Flow with Convolutional Networks, In International Conference on Computer Vision, 2015, pp. 2758-2766.

Eves, Elementary Matrix Theory, Dover Books on Mathematics, 1980.

Fu et al., Dual Attention Network for Scene Segmentation, 2019 Conference on Computer Vision and Pattern Recognition, 2019, pp. 3146-3154.

Gadde et al., Semantic Video CNNs through Representation Warping, In Computer Vision and Pattern Recognition, 2017, pp. 1-10.

He et al., Deep Residual Learning for Image Recognition, In Proceedings of the IEEE Conference on Computer Vision and Pattern Recognition, Jun. 2016, 9 pages.

He et al., Dynamic Multi-Scale Filters for Semantic Segmentation, In International Conference on Computer Vision, 2019, pp. 3562-3572.

He et al., Knowledge Adaptation for Efficient Semantic Segmentation, In Computer Vision and Pattern Recognition, 2019, pp. 578-587.

He et al., STD2P: RGBD Semantic Segmentation using Spatio-Temporal Data-Driven Pooling, In Computer Vision and Pattern Recognition, 2017, pp. 1-10.

Hinton et al., Distilling the Knowledge in a Neural Network, Conference on Neural Information Processing Systems Deep Learning and Representation Learning Workshop, Mar. 9, 2015, 9 pages.

Huang et al., Densely Connected Convolutional Networks, In Computer Vision and Pattern Recognition, 2017, pp. 4700-4708.

Ioannou et al., Deep Roots: Improving CNN Efficiency with Hierarchical Filter Groups, In Computer Vision and Pattern Recognition, 2017, pp. 1231-1240.

Jain et al., Accel: A Corrective Fusion Network for Efficient Semantic Segmentation on Video, In Computer Vision and Pattern Recognition, Jul. 5, 2019, pp. 1-10.

Jin et al., Video Scene Parsing with Predictive Feature Learning, In International Conference on Computer Vision, 2017, pp. 5580-5588.

Kreso et al., Ladder-Style DenseNets for Semantic Segmentation of Large Natural Images, In International Conference on Computer Vision Workshop, 2017, pp. 238-245.

Krizhevsky et al., ImageNet Classification with Deep Convolutional Neural Networks, In Advances in Neural Information Processing Systems, vol. 25, No. 2, Dec. 2012, 9 pages.

Kundu et al., Feature Space Optimization for Semantic Video Segmentation, In Computer Vision and Pattern Recognition, 2016, 8 pages.

Li et al., Attention-Guided Unified Network for Panoptic Segmentation, In Computer Vision and Pattern Recognition, 2019, pp. 7026-7035.

Li et al., DFANet: Deep Feature Aggregation for Real-Time Semantic Segmentation, In Computer Vision and Pattern Recognition, Apr. 3, 2019, pp. 1-10.

Li et al., Expectation-Maximization Attention Networks for Semantic Segmentation, In International Conference on Computer Vision, 2019, pp. 9167-9176.

Li et al., Low-Latency Video Semantic Segmentation, In Computer Vision and Pattern Recognition, Apr. 2, 2018, pp. 1-9.

Liu et al., Auto-DeepLab: Hierarchical Neural Architecture Search for Semantic Image Segmentation, In Computer Vision and Pattern Recognition, Apr. 6, 2019, 11 pages.

Liu et al., Structured Knowledge Distillation for Semantic Segmentation, In Computer Vision and Pattern Recognition, 2019, pp. 2604-2613.

Long et al., Fully Convolutional Networks for Semantic Segmentation, In Proceedings of the IEEE Conference on Computer Vision and Pattern Recognition, 2015, 10 pages.

Mahasseni et al., Budget-Aware Deep Semantic Video Segmentation, IEEE Conference on Computer Vision and Pattern Recognition, 2017, pp. 1-10.

Mazzini, Guided Upsampling Network for Real-Time Semantic Segmentation, The British Machine Vision Conference (BMVC), Jul. 19, 2018, pp. 1-12.

(56) References Cited

OTHER PUBLICATIONS

Nilsson et al., Semantic Video Segmentation by Gated Recurrent Flow Propagation, In Computer Vision and Pattern Recognition, Oct. 2, 2017, 11 pages.
Oh et al., Video Object Segmentation Using Space-Time Memory Networks, In International Conference on Computer Vision, Aug. 12, 2019, 10 pages.
Orsic et al., In Defense of Pre-Trained Imagenet Architectures for Real-Time Semantic Segmentation of Road-Driving Images, In Computer Vision and Pattern Recognition, Apr. 12, 2019, 10 pages.
Paszke et al., ENet: A Deep Neural Network Architecture for Real-Time Semantic Segmentation, Under Review as a Conference Paper at ICLR 2017, Jun. 7, 2016, pp. 1-10.
Peng et al., Large Kernel Matters—Improve Semantic Segmentation by Global Convolutional Network, In Computer Vision and Pattern Recognition, Mar. 8, 2017, 11 pages.
Shelhamer et al., Clockwork Convnets for Video Semantic Segmentation, In European Conference on Computer Vision, Aug. 11, 2016, pp. 1-16.
Shuai et al., DAG-Recurrent Neural Networks for Scene Labeling, In Computer Vision and Pattern Recognition, Nov. 23, 2015, 10 pages.
Silberman et al., Indoor Segmentation and Support Inference from RGBD Images, European Conference on Computer Vision, 2012, pp. 1-14.
Simonyan et al., Very Deep Convolutional Networks for Large-Scale Image Recognition, Published as a Conference paper at International Conference on Learning Representations 2015, Apr. 10, 2015, 14 pages.
Szegedy et al., Inception-v4, Inception-ResNet and the Impact of Residual Connections on Learning, Proceedings of the Thirty-First Association for the Advancement of Artificial Intelligence Conference on Artificial Intelligence, Feb. 2017, pp. 4278-4284.
Takikawa et al., Gated-SCNN: Gated Shape CNNs for Semantic Segmentation, Proceedings of the Institute of Electrical and Electronics Engineers/CVF International Conference on Computer Vision (ICCV), 2019, pp. 5229-5238.
Tang et al., Normalized Cut Loss for Weakly-Supervised CNN Segmentation, Conference on Computer Vision and Pattern Recognition, Apr. 4, 2018, 10 pages.
Tang et al., On Regularized Losses for Weakly-Supervised CNN Segmentation, European Conference on Computer Vision, Apr. 10, 2018, 18 pages.
Tripathi et al., Semantic Video Segmentation: Exploring Inference Efficiency, Institute of Electrical and Electronics Engineers, International SoC Design Conference (ISOCC), 2015, 2 pages.
Vaswani et al., Attention is all You Need, 31st Conference on Neural Information Processing Systems, 2017, pp. 1-11.
Veit et al., Residual Networks Behave Like Ensembles of Relatively Shallow Networks, Conference on Neural Information Processing Systems, Oct. 27, 2016, 9 pages.
Wang et al., Non-Local Neural Networks, Conference on Computer Vision and Pattern Recognition, Apr. 13, 2018, 10 pages.
Wu et al., Wider or Deeper: Revisiting the ResNet Model for Visual Recognition, Pattern Recognition, vol. 90, Jun. 2019, pp. 119-133.
Yu et al., BiSeNet: Bilateral Segmentation Network for Real-Time Semantic Segmentation, European Conference on Computer Vision, Aug. 2, 2018, 17 pages.
Zagoruyko et al., Wide Residual Networks, British Machine Vision Conference, Jun. 14, 2017, 15 pages.
Zhang et al., Context Encoding for Semantic Segmentation, Conference on Computer Vision and Pattern Recognition, Mar. 23, 2018, 11 pages.
Zhao et al., ICNet for Real-Time Semantic Segmentation on High-Resolution Images, European Conference on Computer Vision, Aug. 20, 2018, 16 pages.
Zhao et al., Pyramid Scene Parsing Network, Institute of Electrical and Electronics Engineers Conference on Computer Vision and Pattern Recognition, Apr. 27, 2017, 11 pages.
Zhu et al., An Empirical Study of Spatial Attention Mechanisms in Deep Networks, International Conference on Computer Vision, Apr. 11, 2019, 10 pages.
Zhu et al., Asymmetric Non-Local Neural Networks for Semantic Segmentation, International Conference on Computer Vision, Aug. 29, 2019, 12 pages.
Zhu et al., Deep Feature Flow for Video Recognition, Conference on Computer Vision and Pattern Recognition, Jun. 5, 2017, 13 pages.
Zhu et al., Improving Semantic Segmentation via Video Propagation and Label Relaxation, Conference on Computer Vision and Pattern Recognition, Jul. 3, 2019, pp. 8856-8865.

* cited by examiner

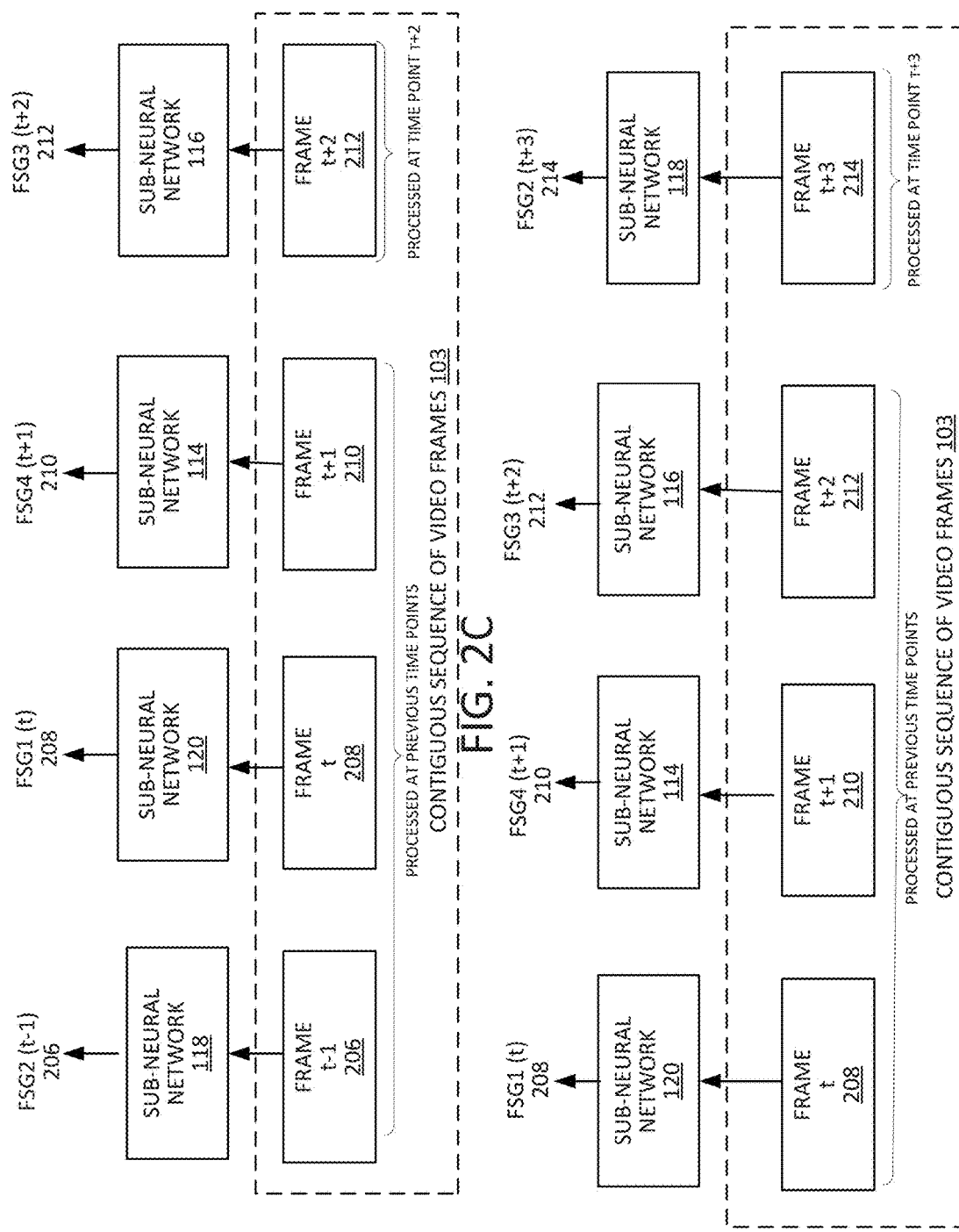

TEMPORALLY DISTRIBUTED NEURAL NETWORKS FOR VIDEO SEMANTIC SEGMENTATION

TECHNICAL FIELD

This disclosure relates generally to semantic segmentation of video frames. More specifically, but not by way of limitation, this disclosure describes techniques for performing fast and accurate video semantic segmentation using a set of temporally distributed neural networks.

BACKGROUND

Semantic segmentation of images and videos is attracting a lot of interest, especially for computer vision and machine learning applications. Semantic segmentation is used in various areas such as autonomous driving, indoor navigation, virtual or augmented reality systems, scene understanding, and so on. Semantic segmentation for an image refers to the process of associating each pixel of the image with a semantic or class label, where the class label is selected from multiple class labels. For example, for an autonomous driving application, the labels could include labels referring to a road, car, person, sky, sidewalk, etc. A pixel present in an area of the image depicting a car may be associated with the car label. For a video comprising a sequence of video frames or images, video semantic segmentation refers to the process of assigning pixel-wise semantic or class labels to the video frames.

Applications using semantic segmentation need the segmentation results to be accurate. Additionally, where semantic segmentation is used for real-time applications, the semantic segmentation processing has to be performed in a fast and efficient manner. Accordingly, several real-world applications that use semantic segmentation require both high accuracy and low latency. Conventional semantic segmentation techniques however try to balance a trade-off between accuracy and speed but cannot provide both.

SUMMARY

This disclosure relates generally to semantic segmentation of video frames. More specifically, but not by way of limitation, this disclosure relates to a Video Semantic Segmentation System (VSSS) that implements a set of temporally distributed neural networks for efficiently performing video semantic segmentation.

In certain embodiments, a method for performing accurate and fast video semantic segmentation is disclosed. The method involves extracting, from each video frame in a contiguous sequence of video frames, a group of features using a different one of a set of sub-neural networks. The contiguous sequence of video frames comprises a current video frame and a set of one or more additional video frames occurring in the contiguous sequence prior to the current video frame. For each video frame in the contiguous sequence of video frames, the group of features extracted from the video frame is different from groups of features extracted from the other video frames in the sequence of video frames. The method includes generating a full feature representation for the current video frame based upon the groups of features extracted from the contiguous sequence of video frames. The method further includes segmenting the current video frame based upon the full feature representation to generate a segmentation result. The segmentation result comprises information identifying, for each pixel in the current video frame, a label selected for the pixel based upon the full feature representation, wherein the label is selected from a plurality of labels. The method includes outputting the segmentation result.

In certain embodiments, the groups of features, extracted from the video frames in the sequence of video frames, together represent a total set of features used for segmenting the current video frame. In certain examples, the set of sub-neural networks comprises a first sub-neural network and a second sub-neural network. The first sub-neural network is trained to extract a first group of features from a first video frame in the sequence of video frames and the second sub-neural network is trained to extract a second group of features from a second video frame in the sequence of video frames. The first video frame is different from the second video frame and the first group of features is different from the second group of features.

In certain embodiments, each sub-neural network generates a Value feature map, a Query map, or a Key map. The Value feature map comprises the group of features extracted by each sub-neural network, and the Query map and the Key map comprise information related to correlations between pixels across the video frames or across adjacent video frames in the contiguous sequence.

In certain examples, generating the full feature representation for the current video frame comprises combining the group of features extracted from the video frames in the sequence of video frames. In certain examples, generating the full feature representation for the current video frame comprises generating, for each video frame in the set of additional video frames, an affinity value between pixels of the video frame in the set of additional video frames and the current video frame and based on the affinity value, updating a Value feature map of the current video frame to generate a full feature representation of the current video frame.

In certain embodiments, generating the full feature representation for the current video frame comprises computing a correlation between pixels of a first video frame in the sequence and a second video frame in the sequence, where the first video frame is adjacent to the second video frame in the sequence and occurs before the second video frame in the sequence.

In certain embodiments, generating the full feature representation for the current video frame comprises comparing the first video frame in the sequence with the second video frame in the contiguous sequence by computing an attention value between the pixels of the first video frame and the pixels of the second video frame, wherein the attention value measures the correlation between the pixels of the first video frame and the pixels of the second video frame. The method further includes obtaining a Value feature map of the first video frame and a Value feature map of the second video frame and updating the Value feature map of the second video frame based on the attention value, the Value feature map of the first video frame and the Value feature map of the second video frame.

In certain embodiments, the method comprises determining that only the current video frame is left in the contiguous sequence of video frames and based on the determining, outputting the Value feature map for the current video frame, wherein the Value feature map represents the full feature representation for the current video frame.

In certain examples, wherein the segmentation result comprises an image of the current video frame, wherein each pixel in the image of the current video frame is colored using a color corresponding to the label associated with the pixel. In certain examples, a feature space representing a set of features to be used for segmenting video frames in the sequence of video frames is divided into a number of groups of features. The number of sub-neural networks in the set of sub-neural networks is equal to the number of the groups of features. In certain examples, the number of groups of features is four. In certain examples, a number of layers in each sub-neural network from the plurality of sub-neural networks is the same. In certain examples, a number of nodes in each sub-neural network from the plurality of sub-neural networks is the same.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 2A, 2B, 2C, and 2D illustrate how video frames are presented to the different sub-neural networks for processing according to certain embodiments.

DETAILED DESCRIPTION

Figure 1:
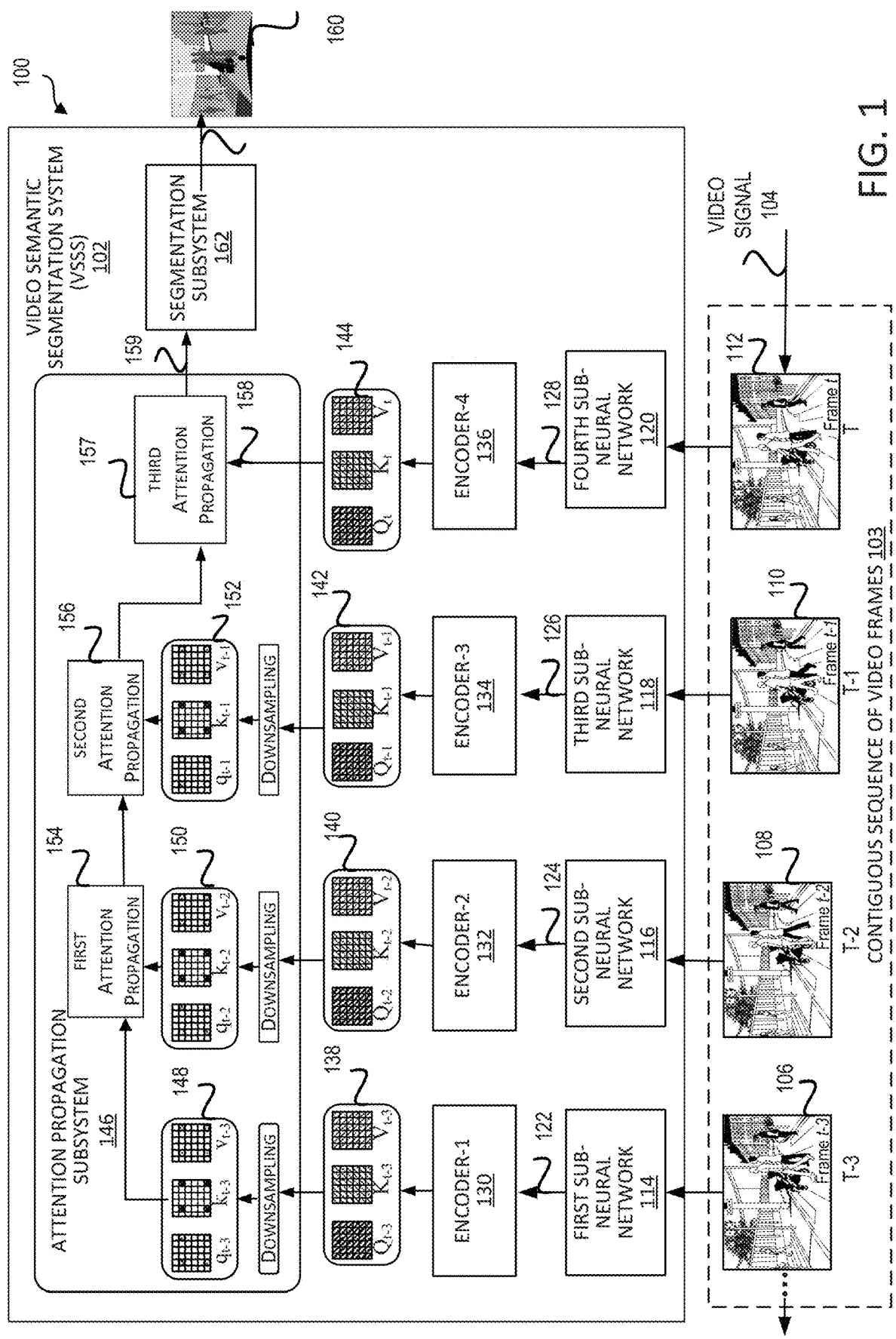
FIG. 1 depicts an example computing environment including a Video Semantic Segmentation System that is configured to perform accurate and fast semantic segmentation of videos using a set of temporally distributed neural networks, according to certain embodiments.

This disclosure relates generally to semantic segmentation of video frames. More specifically, but not by way of limitation, this disclosure describes techniques for performing fast and accurate video semantic segmentation using a set of temporally distributed neural networks.

The present disclosure describes a video semantic segmentation system (VSSS) that uses a set of multiple neural networks to perform accurate and fast video semantic segmentation. The set of multiple neural networks are used for features extraction, with each neural network trained to extract a particular group or subset (or subspace) of features of the feature space, and the multiple neural network are trained to extract different groups of features. A full feature representation, representing all the features to be used for segmenting for a current or target video frame is generated based upon a group of features extracted from the current video frame by a neural network from the set of neural networks and groups of features extracted by other neural network in the set of neural networks from a set of video frames that are contiguous and occur in the video signal prior to the current video frame. The full feature representation is then used to segment the current video frame.

As described in the Background section, applications that use semantic segmentation require both high accuracy of the segmentation results and low latency (i.e., the semantic segmentation processing has to be performed in a fast and efficient manner). Conventional semantic segmentation techniques, especially for video semantic segmentation, however try to balance a trade-off between accuracy and speed but cannot provide both. In order to obtain accurate segmentation results, strong feature representations are needed. However, computing and processing strong features typically requires deep neural networks with high computation costs that result in slower performance. Some conventional solutions apply a deep image segmentation model to each frame of the video independently ("per-frame model"), but this approach does not leverage temporal information provided in video dynamic scenes. Some other conventional approaches apply the same deep image segmentation model to all the video frames and add additional layers on top to model the temporal context to extract better features. While these approaches improve accuracy over per-frame model approaches, they incur additional computation as all the features have to be computed for each video frame and are thus slower.

To reduce redundant computation, some conventional approaches apply a strong image segmentation model only at key video frames, and reuse the high-level features for other video frames. The challenge for these approaches is how to robustly propagate pixel-level information over time, which might be misaligned due to motion between frames. This often leads to decreased accuracy compared to a baseline image segmentation model. Additionally, these approaches have different computational loads between key video frames and non-key video frames, which results in high maximum latency and unbalanced occupation of computation resources that decreases overall system efficiency. To address this issue, some approaches directly reuse high-level features extracted from deep layers at a low resolution, which are relatively stable over time. Some other approaches adopt optical flow techniques to warp high-level features at key video frames to non key video frames. The flow warped feature maps are updated with shallow features extracted at the current video frame. However, using optical flow incurs significant computation cost and can fail with large motion, disocclusions, and non-textured regions. To avoid using optical flow, some approaches instead propose to use spatially variant convolutions to adaptively aggregate features within a local window. However, these approaches are still limited by motion beyond that of the predefined window. Thus although the overall computation is reduced compared to their image segmentation baselines, the accuracy is also decreased. In addition, due to the extraction of high-level features at key video frames, these methods exhibit inconsistent speeds, with the maximum latency equivalent to that of the single-video frame deep model.

The various embodiments described in the present disclosure perform both fast and accurate video semantic segmentation using a set of temporally distributed neural networks. The techniques described herein address, overcome, or avoid the deficiencies of conventional techniques described above.

In one embodiment, a Video Semantic Segmentation System (VSSS) is disclosed that is configured to perform accurate and fast semantic segmentation of videos using a set of temporally distributed neural networks. In certain embodiments, the VSSS receives as input a video signal comprising a contiguous sequence of temporally-related video frames. As part of performing video semantic segmentation, the VSSS extracts features from the video frames in the contiguous sequence and then, based upon the extracted features, selects, from a set of labels, a label to be associated with each pixel of each video frame in the video signal. As indicated above, in the past this was typically performed using a single deep neural network that was used to extract a rich feature set, which was then used for segmentation. As disclosed herein, instead of using a single deep neural network, a set of multiple neural networks are used to extract the features to be used for video segmentation and the extraction of features is distributed among the multiple neural networks in the set. In certain embodiments, each of the neural networks in the set of neural networks is shallower than a typical single deep neural network that would have been used for the feature extraction conventionally. In certain embodiments, the neural networks in the set of neural networks all have the same structure, including the same number of layers.

In order for the extraction of features to be distributed among multiple neural networks in the set of neural networks, the totality (i.e., the total set) of features (or feature space) to be extracted from each video frame in the video for the segmentation operation are divided into groups of features. The feature space representing the totality of features to be extracted for the segmentation (e.g., the feature space that would be extracted by the single deep neural network) is thus broken down into multiple subspaces of features, each subspace representing a particular group or subset of features from the total set of features. For example, the features (representing the feature space) extracted by a single deep learning model for purposes of segmentation may be subdivided into "m" distinct groups of features (or "m" feature subspaces). Each group of features in the "m" groups of features is different from the other (m−1) groups of features. When taken together, the "m" groups of features represent the totality of features (the full feature space) to be extracted for the video segmentation operation. The "m" neural networks are used to approximate the "m" groups of features, with each neural network configured to approximate a particular group of features from the "m" groups of features. In this manner, each neural network in the set of multiple neural networks is trained to extract a particular subspace of features that is different from the subspaces of features extracted by the other (m−1) neural networks. Since each neural network in the set of neural networks is trained to extract a particular subspace of features, each neural network in the set of multiple neural networks is also sometimes referred to herein as a "sub-neural network." The values for "m" may be 2, 3, 4, 5, 6, etc. By enabling each neural network to cover a separate feature subspace of the features in the feature space of a deep learning model, a strong feature representation representing the entirety of the features can be produced for each video frame in the sequence of video frames by reassembling or aggregating the output features extracted by the multiple neural networks.

In certain embodiments, the output from the VSSS after the video semantic segmentation has been performed is a set of segmented video frames of the video signal where a class label is associated with each pixel of each video frame in the video signal. In certain embodiments, a color may be associated with each label in the set of labels. In such an embodiment, the VSSS may output segmented video frames, where for a segmented video frame, each pixel in the frame has a color corresponding to the color that is associated with the label associated with that pixel.

A "neural network" (sometimes also referred to as an Artificial Neural Network (ANN)) is an example of an artificial intelligence computational model (e.g., a machine learning model) comprising multiple nodes or units (sometimes referred to as "perceptrons") arranged in layers. A neural network including the nodes of the neural network may be implemented in software only (e.g., code, instructions, program) executed by one or more processors, in hardware, or combinations thereof. Each node in the neural network receives one or more inputs and computes an output. Each input to a node has an associated weight that is assigned based upon the relative importance of that input to other inputs to that node. In some instances, a node may also receive an additional bias input. The node applies a function "f" (also referred to as an "activation function") to the weighted sum of its inputs and the bias input to generate the output. The activation function can be linear or a non-linear function. Accordingly, an output of a node can be represented as $Y=f(w_1.X_1+w_2.X_2+ \ldots +w_i.X_i+b)$, where "xi" is an input to the node, "$w_i$" is the associated weight, "b" is the bias, and "f" is the activation function. Examples of commonly used activation functions include without restriction a sigmoid function, a hyperbolic tangent (tanh) function, a rectified linear unit (ReLu) function, and others. The output of a node can be provided as an input to one or more other nodes in the neural network. For example, an output of a node in a particular layer of the neural network can be provided as inputs to nodes of the next layer in the neural network.

The nodes in a neural network may be organized into layers including an input layer, an output layer, and zero or more hidden layers sandwiched between the input and output layers. Each layer may comprise one or more nodes. The inputs to nodes in the input layer represent inputs provided to the neural network. The outputs from the one or more nodes in the output layer represent the results or predictions/inferences made by the neural network. The nodes in a layer of a neural network may receive inputs from another layer (e.g., from a previous layer) in the neural network, compute outputs, and forward the outputs to nodes of another layer (e.g., to the next layer) in the neural network.

A neural network typically has to be trained before it can be used for inferencing or making predictions. Training may be performed using labelled training data, where inputs and labels (ground truths) associated with those inputs are known. For example, the training data may include inputs x(i), and for each input x(i), a target value or right answer (also referred to as the ground truth) y(i) for that input. A pair of (x(i), y(i)) is called a training example, and the training data may comprise multiple such training examples. The space of all the inputs x(i) in the training data may be denoted by X, and the space of all the corresponding targets y(i) may be denoted by Y. The goal of the training is to learn a function "h( )" (also sometimes referred to as the hypothesis function) that maps the training input space X to the target value space Y (i.e., h: X→Y), such that h(x) is a good predictor for the corresponding value of y. Various different techniques may be used to learn this hypothesis function. In some techniques, as part of deriving the hypothesis function, a cost or loss function may be defined that measures the difference between the ground truth value for an input and the value predicted for that input by the neural network. As part of the training, techniques are used to minimize this cost or loss function. Various different training techniques may be used such as various back propagation training techniques that iteratively modify/manipulate the weights associated with inputs to the nodes in the neural network with the goal to minimize the loss function associated with the output(s) provides by the output layer of the neural network.

Referring now to the drawings, FIG. 1 depicts an example computing environment 100 including a Video Semantic Segmentation System (VSSS) 102 that is configured to perform accurate and fast semantic segmentation of videos using a set of temporally distributed neural networks, according to certain embodiments. VSSS 102 and its subsystems may be implemented using only software only (e.g., code, instructions, program) executed by one or more processors, only hardware, or combinations thereof. The software may be stored on a non-transitory storage medium (e.g., on a memory device). VSSS 102 may be implemented by one or more computing systems. For example, one or more computing systems may execute the software (e.g., code, instructions, program) implementing VSSS 102. In the embodiment depicted in FIG. 1, VSSS 102 includes a set of sub-neural networks (114, 116, 118, and 120), a set of encoders (130, 132, 134, and 136), an attention propagation subsystem 146, and a segmentation subsystem 150. Portions of data or information used by or generated by VSSS 102 as part of its processing may be stored in a persistent memory (e.g., a data store (not shown in FIG. 1) of VSSS 102.

VSSS 102 is configured to perform highly accurate video semantic segmentation at low latency. As depicted in FIG. 1, in certain embodiments, VSSS 102 receives as input a video signal 104 comprising a contiguous sequence of temporally-related video frames 103. Video signal 104 may be received from one or more sources that are communicatively coupled to VSSS 102 possibly via one or more communication networks. In certain instances, video signal 104 may represent a live video stream received from a streaming video source such as a camera system. In other instances, video signal 104 may represent video information from a stored video file that VSSS 102 may access and/or download from a storage location (e.g., from a web-sharing website (or web application)). In other instances, video signal 104 may represent a personal video stored by a user in a data store of video sematic segmentation system 102. In certain embodiments, VSSS 102 may include a user interface (e.g., a touchscreen display) that enables a user to identify the video that is to be segmented or identify a source streaming a video to be segmented.

As a result of the video semantic segmentation performed by VSSS 102, each pixel of each video frame of video signal 104 is associated with a semantic or class label ("class label"), where the class label associated with a pixel is selected from a pre-configured set of multiple class labels. In certain embodiments, only one label is associated with each pixel. For example, if the video 104 is being segmented for an autonomous driving application, the set of labels could include labels referring to a road, a car, a person, a sky, a sidewalk, etc. A pixel in a video frame may be associated with a label that is representative of the content represented by the pixel in that video frame. For example, for a particular video frame in the video signal: a pixel present in an area of the video frame depicting a car may be associated with the "car" label; a pixel present in an area of the video frame depicting the road may be associated with the "road" label; a pixel present in an area of the video frame depicting the sky may be associated with the "sky" label; and so on.

The output from VSSS 102 after the video semantic segmentation has been performed is a set of segmented video frames 160 of video signal 104 where a class label is associated with each pixel of each video frame in video signal 104. In certain embodiments, a color may be associated with each label in the set of labels. In such an embodiment, VSSS 102 may output segmented video frames, where for a segmented video frame, each pixel in the frame has a color corresponding to the color that is associated with the label associated with that pixel.

As part of performing video semantic segmentation, VSSS 102 is configured to extract features from video frames in video signal 104 and then, based upon the extracted features, select, from a set of labels, a label to be associated with each pixel of each video frame in video signal 104. As indicated above, in the past this was typically performed using a single deep neural network that was used to extract a rich feature set, which was then used for segmentation. As disclosed herein, instead of using a single deep neural network, a set of multiple neural networks are used to extract the features to be used for video segmentation and the extraction of features is distributed among the multiple neural networks in the set. In certain embodiments, each of the neural networks in the set of neural networks is shallower than a typical single deep neural network that would have been used for the feature extraction conventionally. In certain embodiments, the neural networks in the set of neural networks all have the same structure, including the same number of layers.

For purposes of this disclosure, the terms "shallow" or "shallower" when used in the context of neural networks refer to the number of layers in a neural network. A first neural network is shallower than a second neural network if the number of layers in the first neural network is less than the number of layers in the second neural network.

In order for the extraction of features to be distributed among multiple neural networks in the set of neural networks, the totality of features to be extracted for the segmentation operation are divided into groups of features. The feature space representing the totality of features to be extracted for the segmentation (e.g., the feature space that would be extracted by the single deep neural network) is thus broken down into multiple subspaces of features, each subspace representing a particular group of features from the total set of features. For example, the features (representing the feature space) extracted by a single deep learning model for purposes of segmentation may be subdivided into "m" distinct groups of features (or "m" feature subspaces). Each group of features in the "m" groups of features is different from the other (m−1) groups of features. When taken together, the "m" groups of features represent the totality of features (the full feature space) to be extracted for the video segmentation operation. The "m" neural networks are used to approximate the "m" groups of features, with each neural network configured to approximate a particular group of features from the "m" groups of features. In this manner, each neural network in the set of multiple neural networks is trained to extract a particular subspace of features that is different from the subspaces of features extracted by the other (m−1) neural networks. Since each neural network in the set of neural networks is trained to extract a particular subspace of features, each neural network in the set of multiple neural networks is also sometimes referred to as a "sub-neural network." The values for "m" may be 2, 3, 4, 5, 6, etc. By enabling each neural network to cover a separate feature subspace of the features in the feature space of a deep learning model, a strong feature representation representing the entirety of the features can be produced for each video frame in the sequence of video frames by reassembling or aggregating the output features extracted by the multiple neural networks.

For example, if the feature space representing all the features to be extracted from a video frame for segmentation is subdivided into "m" groups of features, then "m" sub-neural networks are used for the feature extraction, each of the "m" sub-neural networks is trained to extract and approximate a particular group of features. In the embodiment depicted in FIG. 1, the feature space is divided into four groups, and VSSS 102 comprises a set of four temporally distributed sub-neural networks 114, 116, 118, and 120, each sub-neural network is trained to extract, from each video frame in video signal 104, a particular group of features corresponding to that sub-neural network. In certain examples, for balanced and efficient processing of the input video frames over time, the "m" sub-neural networks share the same architecture, including the number of layers in each sub-neural network. In certain embodiments, the number of nodes (or perceptrons) in each sub-neural network and the arrangement and distribution of the nodes among the multiple layers of the sub-neural networks is also the same across the multiple sub-neural networks. In certain instances, with respect to a traditional deep neural network of N layers that is used for video segmentation, the number of layers in each sub-neural network is set to be 1/N of the size of the deep neural network. For example, if the deep neural network had 100 layers, and "m" is 4, then each sub-neural network (e.g., neural networks 114, 116, 118, 1120) has 25 layers.

As depicted in FIG. 1, the video frames received in video signal 104 are sequentially and circularly assigned to each of sub-neural networks 114, 116, 118, and 120 for processing over time and each sub-neural network is configured to extract a different subgroup of features from each received video frame. Assuming there are "m" independent feature extraction paths corresponding to the "m" sub-neural networks, the full feature representation for frame t is generated by combining the group of features extracted by a sub-neural network for frame t with the groups of features extracted from each of the previous (m−1) frames by each of the other sub-neural networks, respectively. The number of sub-neural networks thus determines that number of temporally contiguous sequence of video frames (also referred to as a window of frames) that are used for generating the full feature space for a frame. For example, as shown in FIG. 1, when VSSS 102 receives a current video frame (Frame t) 112 at time T, the frame is provided to sub-neural network 120 for processing. Sub-neural network 120 is trained to extract a particular group of features from frame t 112. In the embodiment depicted in FIG. 1 comprising four sub-neural networks, the full feature set for frame t 112 is generated by combining the group of features extracted by sub-neural network 120 for frame t 112 received by VSSS 102 at time T, the group of features extracted by sub-neural network 118 from frame (t−1) 110 received by the VSSS 102 at time (T−1), the group of features extracted by sub-neural network 116 from frame (t−2) 108 received by the VSSS 102 at time (T−2), and the group of features extracted by sub-neural network 114 frame (t−3) 106 received by the VSSS 102 at time (T−3). This full feature set is then used for segmentation of video frame t.

Accordingly, in certain implementations, for a video frame t received by VSSS 102 at time T, a temporally contiguous sequence (window) of video frames is used to generate the full feature set for frame t. This contiguous sequence includes video frames received by VSSS 102 from a time (T−m+1) to a current time T when frame t was received, where "m" is the total number of sub-neural networks in VSSS 102. Accordingly, upon receiving a current frame (frame t), a contiguous sequence of video frames received immediately prior to the current video frame is identified. For instance, in the embodiment shown in FIG. 1, groups of features extracted from a contiguous sequence of video frames 103 received from time (T−3) (i.e., video frame 106) to time T for the current video frame t 112 are used to generate the full feature set for frame t.

Each sub-neural network (e.g., each of sub-neural networks 114, 116, 118 and 120) is trained extract a group of features from a video frame, where the group of features extracted by that sub-neural network is different from the group of features extracted by the other sub-neural networks. In certain embodiments, the sub-neural networks are trained such that the groups of the features extracted by the sub-neural networks are different and complementary to each other and when taken together represent the entire set of features (i.e., the full feature space). As depicted in FIG. 1, sub-neural network 114 is configured to extract a first group of features 122, sub-neural network 114 is configured to extract a second group of features 124, sub-neural network 118 is configured to extract a third group of features 126, and sub-neural network 120 is configured to extract a fourth group of features 128, where the various groups of features (122, 124, 126 and 128) together represent the full feature set (i.e., the entire feature space) used for segmentation of a video frame. The extracted features may include, for instance, visual content, audio, text (e.g., speech-to-text translation, closed captioning, subtitles, screenplay or script, etc.), metadata, or other data corresponding to video frames such as edges, textures, geometric primitives, contours etc. in video signal 104.

Further details on how these sub-neural networks are trained to extract the respective groups of features are described below with reference to FIG. 5.

FIGS. 2A, 2B, 2C, and 2D illustrate how video frames are presented to the different sub-neural networks for processing according to certain embodiments. For purposes of FIGS. 2A, 2B, 2C, and 2D, it is assumed that T, (T+1), (T+2), (T−1), (T−2), (T−3), etc. represent various time points at which video frames are received by VSSS 102. For example: a video frame received at (T−1) is received immediately before and contiguous to a video frame received at time point T; a video frame received at (T−2) is received immediately before and contiguous to a video frame received at time point (T−1); a video frame received at (T−3) is received immediately before and contiguous to a video frame received at time point (T−2); a video frame received at (T+1) is received immediately after and contiguous to a video frame received at time point (T); a video frame received at (T+2) is received immediately after and contiguous to a video frame received at time point (T+1), and so on. The actual times represented by time points T, (T−1), (T−2), (T−3), (T+1), (T+2), etc. depend upon the frame rate of the video frames.

Figure 2A:
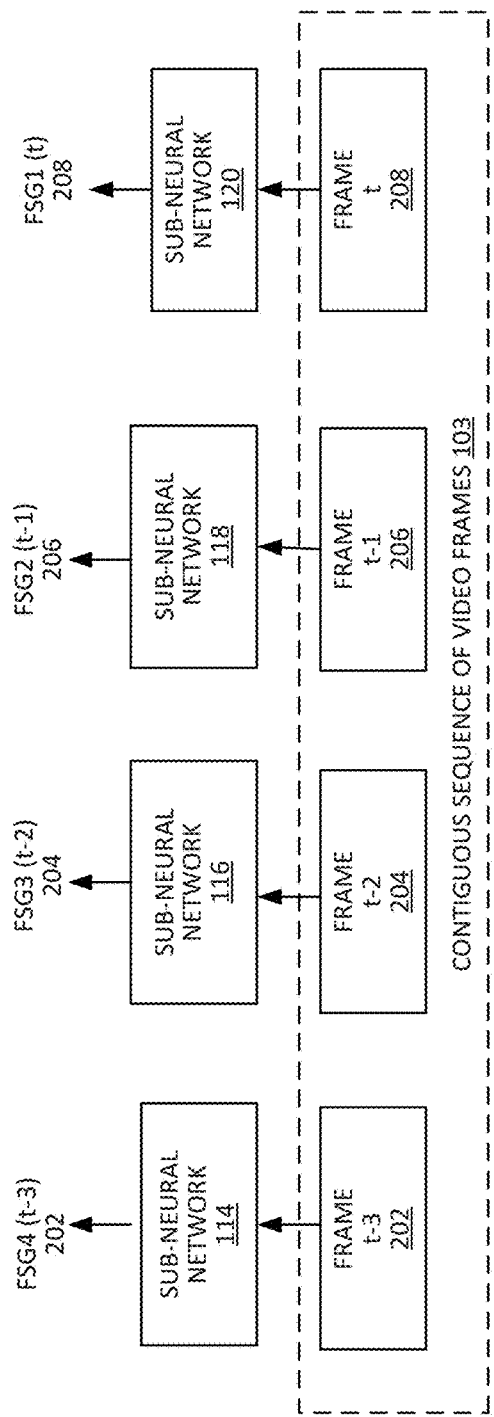

As depicted in FIG. 2A, VSSS 102 receives a video frame t at time T. It is further assumed that before time T, video frames (t−1), (t−2), and (t−3) have been previously received by VSSS 102 at time points (T−1), (T−2), and (T−3), respectively. Upon receipt of frame t at time point T, frame t is presented to sub-neural network 120 that is trained to extract a first group of features FSG1 from frame t (represented by FSG1(t) 208 in FIG. 2A). At about the same time point T: frame (t−1) is presented to sub-neural network 118 that is trained to extract a second group of features FSG2 from frame (t−1) (represented by FSG2(t−1) 206 in FIG. 2A); frame (t−2) is presented to sub-neural network 116 that is trained to extract a third group of features FSG3 from frame (t−2) (represented by FSG3(t−2) 204 in FIG. 2A); and frame (t−3) is presented to sub-neural network 114 that is trained to extract a fourth group of features FSG4 from frame (t−3) (represented by FSG4(t−3) 202 in FIG. 2A). A full feature representation for current video frame t received at time point T is then generated by aggregating the groups of features extracted by the neural networks 114, 116, 118 and 120 for video frames (t−3), (t−2), (t−1), and (t), respectively. This is represented by Equation (1) shown below:

Full feature representation for video frame $t$=FSG1($t$)+FSG2($t$−1)+FSG3($t$−2)+FSG4($t$−3)   (Equation 1)

Figure 2B:
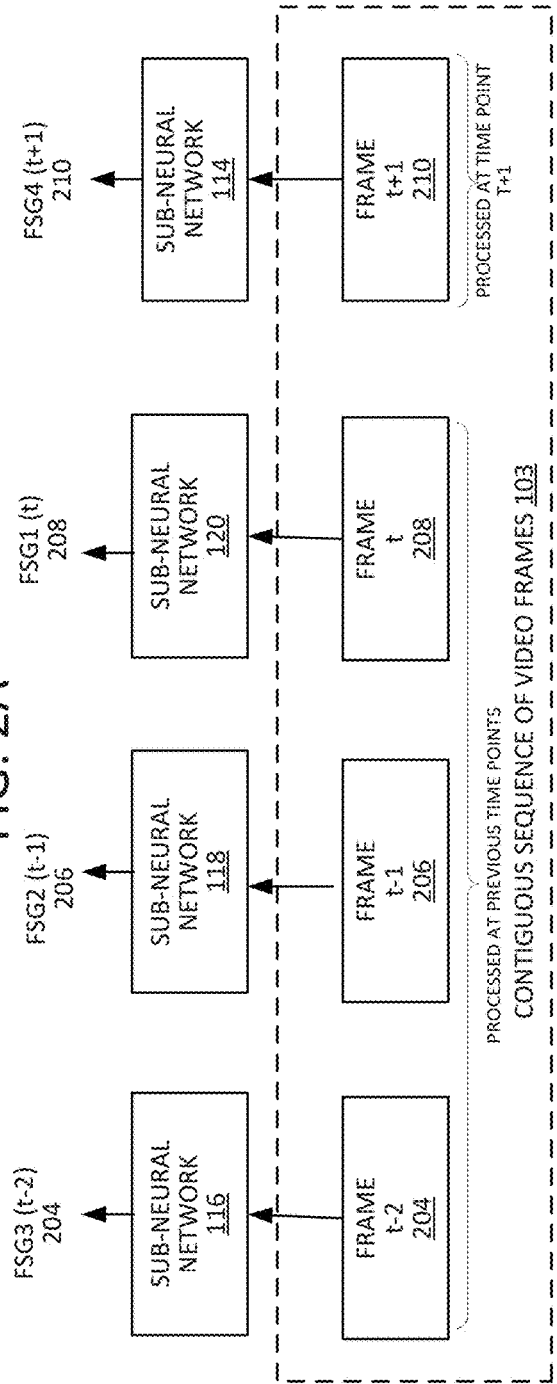

As shown in FIG. 2B, a new video frame (t+1) is received by VSSS 102 at time point (T+1). At time point (T+1), video frame (t+1) is presented to sub-neural network 114 that is circularly assigned to process video frame (t+1) received at time point (T+1). Upon receipt of frame (t+1) at time point (T+1), frame (t+1) is presented to sub-neural network 114 that extracts a fourth group of features FSG4 from frame (t+1) (represented by FSG4(t+1) 210 in FIG. 2B). The groups of features extracted from video frames (t−2) (t−1) and (t) by sub-neural networks 116, 118 and 120 are re-used. As a result, a full feature representation for video frame (t+1) is generated with the computational cost of only one sub-neural network. A full feature representation for video frame (t+1) received at time point (T+1) is generated by aggregating the groups of features extracted by the sub-neural networks 116, 118, 120 and 114 for video frames (t−2), (t−1), (t) and (t+1), respectively. This is represented by Equation (2) shown below:

Full feature representation for video frame ($t$+1)=FSG4($t$+1)+FSG1($t$)+FSG2($t$−1)+FSG3($t$−2)   (Equation 2)

As shown in FIG. 2C, a new video frame (t+2) is received by VSSS 102 at time point (T+2). At time point (T+2), video frame (t+2) is presented to sub-neural network 116 that is circularly assigned to process video frame (t+2) received at time point (T+2). Upon receipt of frame (t+2) at time point (T+2), frame (t+2) is presented to sub-neural network 116 that extracts a third group of features FSG3 from frame (t+2) (represented by FSG3(t+2) 212 in FIG. 2C). The groups of features extracted from video frames (t−1) (t) and (t+1) by sub-neural networks 118, 120 and 114 are re-used. As a result, a full feature representation for video frame (t+2) is generated with the computational cost of only one sub-neural network. A full feature representation for video frame (t+2) 212 received at time point (T+2) is generated by aggregating the groups of features extracted by the neural networks 118, 120, 114 and 116 for video frames (t−1), (t), (t+1) and (t+2), respectively. This is represented by Equation (3) shown below:

Full feature representation for video frame ($t$+2)=FSG3($t$+2)+FSG4($t$+1)+FSG1($t$)+FSG2($t$−1)   (Equation 3)

As shown in FIG. 2D, a new video frame (t+3) is received by VSSS 102 at time point (T+3). At time point (T+3), video frame (t+3) is presented to sub-neural network 118 that is circularly assigned to process video frame (t+3) received at time point (T+3). Upon receipt of frame (t+3) at time point (T+3), frame (t+3) is presented to sub-neural network 118 that extracts a second group of features FSG2 from frame (t+3) (represented by FSG2(t+3) 214 in FIG. 2D). A full feature representation for video frame (t+3) received at time point (T+3) is generated by aggregating the groups of features extracted by the neural networks 120, 114, 116 and 118 for video frames (t), (t+1), (t+2) and (t+3), respectively. This is represented by Equation (4) shown below:

Full feature representation for video frame ($t$+3)=FSG2($t$+3)+FSG3($t$+2)+FSG4($t$+1)+FSG1($t$)   (Equation 4)

As shown in FIGS. 2A, 2B, 2C, and 2D, at any given time point (e.g., T, T+1, T+2, T+3), only one video frame is processed and a group of features is extracted for the video frame using one of the "m" sub-neural networks that is assigned to process and extract the group of features from the video frame. The groups of features extracted from the previous video frames in the contiguous sequence by the other (m−1) sub-neural networks are re-used to generate the full feature representation for the video frame. As a result, a full feature representation for any video frame is generated with the computational cost of only one sub-neural network.

Returning to the discussion of FIG. 1, sub-neural networks 114, 116, 118, and 120 represent independent paths for extracting groups of features from video frames in video signal 104. Each sub-neural network is associated with an encoder that is configured to output the group of features extracted by the corresponding sub-neural network. In the embodiment depicted in FIG. 1, VSSS 102 includes encoders 130, 132, 134 and 136 associated with sub-neural networks 114, 116, 118, and 120, respectively.

Each sub-neural network is trained to extract a group of features (also referred to herein as a sub-feature map) corresponding to that sub-neural network. In addition to generating a Value feature map (also referred to herein as an "activation map") containing the path-specific or sub-neural network specific groups of features, each sub-neural network also generates a Query map and a Key map for building correlations between pixels across video frames. The Query maps and Key maps contain information about correlations between pixels across the video frames in the continuous set of video frames. A sub-neural network-i representing a feature path-i trained to extract a particular group "i" of features extracts a sub feature map $X_i \in \mathcal{R}^{C \times H \times W}$, where C, W, and H denote the size of the channel, the height and the width of the feature maps respectively. The encoder ($E_i$) corresponding to a sub-neural network (i) then converts the sub feature map $X_i$ into a value feature map $V_i \in \mathcal{R}^{C \times H \times W}$, as well as lower dimensional query and key maps $$Q_i \in \mathcal{R}^{\frac{C}{8} \times H \times W}, K_i \in \mathcal{R}^{\frac{C}{8} \times H \times W}.$$

In certain embodiments, this is done with three 1×1 convolutional layers.

For example in FIG. 1, encoder 130 takes the group of features 122 extracted by sub-neural network 114 for a video frame processed by the sub-neural network and outputs 138 including a value feature map V, a query map Q, and a key map K for that video frame. Encoder 132 takes the group of features 124 extracted by sub-neural network 116 for a video frame processed by the sub-neural network and outputs 140 including a value feature map V, a query map Q, and a key map K for that video frame. Encoder 134 takes the group of features 126 extracted by sub-neural network 118 for a video frame processed by the sub-neural network and outputs 142 including a value feature map V, a query map Q, and a key map K for that video frame. Encoder 136 takes the group of features 128 extracted by sub-neural network 120 for a video frame processed by the sub-neural network and outputs 144 including a value feature map V, a query map Q, and a key map K for that video frame.

From a temporal perspective, in certain embodiments, the sub-neural networks process contiguous video frames received in video signal 104. For instance, as shown in FIG. 1, when sub-neural network 120 and encoder 136 is processing frame(t) received by VSSS 102 at time T, sub-neural network 118 and encoder 134 is processing frame (t−1) received at time (T−1), sub-neural network 116 and encoder 132 is processing frame (t−2) received at time (T−2), and sub-neural network 114 and encoder 130 is processing frame (t−3) received at time (T−3). Accordingly, output 138 from encoder 130 includes query map $Q_{t-3}$, a key map $K_{t-3}$ and a value feature map $V_{t-3}$ for frame (t−3), output 140 from encoder 132 includes a query map $Q_{t-2}$, a key map $K_{t-2}$, and a value feature map $V_{t-2}$ for frame (t−2), output 142 from encoder 134 includes a query map $Q_{t-1}$, a key map $K_{t-1}$, and a value feature map $V_{t-1}$ for frame (t−1), and output 144 from encoder 136 includes a query map $Q_t$, a key map $K_t$, and a value feature map $V_t$ for frame (t).

In the embodiment illustrated in FIG. 1, the encoders are shown separately from their corresponding sub-neural networks. This is not intended to be restrictive or limiting. In some other embodiments, the encoding functionality provided by an encoder may be provided by the corresponding sub-neural network itself. Also, while four sub-neural networks and four corresponding encoders are shown in FIG. 1, alternate embodiments can have more or less number of sub-neural networks and encoders.

The outputs of the encoders are then provided as inputs to an attention propagation subsystem 146, which is configured to determine a full feature representation for each video frame in video signal 104. For a particular video frame, the full features (i.e., features in the entire feature space) for that particular video frame are generated based upon the group of features extracted for that particular video frame and groups of features extracted from (m−1) video frames received immediately prior to the particular video frame, where "m" is the number of groups of features and also the number of sub-neural networks in VSSS 102. Accordingly, in a VSSS comprising "m" sub-neural networks (each configured to extract a particular group of features from a set of "m" groups of features), for a frame t received at time T, the full set of features for frame t is generated by aggregating the group of features extracted for frame t with groups of features extracted for frames (t−m+1) received in video signal 104 (i.e., (m−1) frames received immediately prior to frame t in video signal 104). For instance, as shown in FIG. 1, attention propagation subsystem 146 determines a full feature representation for a current video frame t 112 received at time T by aggregating the sub feature maps extracted from video frames (t) 112 received at time (T), frame (t−1) 110 received at time (T−1), frame (t−2) 108 received at time (T−2), and frame (t−3) 106 received at time (T−3).

Attention propagation subsystem 146 may utilize different approaches to generating the full feature representation for a video frame. According to a first approach, assuming "m" groups of features extracted by "m" sub-neural networks, attention propagation subsystem 146 determines the full feature representation for a current video frame by computing an affinity value between the pixels of the current video frame t and the pixels of each of previous (m−1) video frames received immediately prior to the current video frame as part of a contiguous sequence of video frames in video signal 104. In certain examples, the affinity value captures the spatio-temporal variations that cause spatial misalignment caused by the motion between video frames while aggregating feature groups extracted at different time steps.

In a certain implementation, the affinity value between pixels of a current frame (e.g., 112) and the pixels of previous (m−1) video frames is obtained by computing a dot product of the "Q" values of the query map (e.g., Qt) of the current frame (e.g., 112) and the "K" values of the key map (e.g., $K_{t-3}$, $K_{t-2}$, $K_{t-1}$) of each of the previously received (m−1) video frames (e.g., 110, 108 and 106) as shown in equation (5) below:

$$Aff_p = \text{Softmax}\left(\frac{Q_t K_p^T}{\sqrt{d_k}}\right) \quad \text{(Equation 5)}$$

where p indicates a previous video frame, t indicates the current video frame and $d_k$ is the dimension of the query map and the key map computed for the previous video frame p.

The sub-feature maps for the current frame and the previous (m−1) video frames are merged per equation (6) below to compute the full feature representation for the current video frame:

$$V'_t = V_t + \Sigma_{p=p-m+1}^{t-1} \phi(Aff_p V_p) \quad \text{(Equation 6)}$$

In certain embodiments, attention propagation subsystem 146 repeats the process of computing the affinity value (using equation (5)) between the pixels of each previous video frame and the pixels of the current video frame in the contiguous sequence of video frames. At each step of the processing, the affinity value computed between each previous video frame and the current frame pair is used as a weight to update the value feature map of the current video frame. For instance, for the embodiment depicted in FIG. 1, attention propagation subsystem 146, in a first iteration, computes the affinity value between the pixels of previous video frame (t−3) 106 with current video frame t 112 and based on the computed affinity value, updates the value feature map for the current video frame t (using equation (6)) to obtain an aggregated value feature map for the current video frame t. In a second iteration, attention propagation subsystem 146 computes the affinity value between the pixels of previous video frame (t−2) 108 with current video frame t 112 and based on the computed affinity value, updates the aggregated value feature map for the current video frame t (using equation (6)). In a third iteration, attention propagation subsystem 146 computes the affinity value between the pixels of previous video frame (t−1) 110 with current video frame t 112 and based on the computed affinity value, again updates the aggregated value feature map for the current video frame t (using equation (6)). In certain embodiments, the aggregated value feature map for the current video frame t (112) after the three iterations represents the full feature representation for the current frame t.

According to the technique described above that uses equations (5) and (6), the non-local correlation between pixels across video frames is computed with a time complexity of $\mathcal{O}((m-1)d_k H^2 W^2)$ for equation (3), where m is the size of the temporal window, $d_k$ is the number of channel for query and key maps, H and W represents height and width of the feature maps respectively. However, since features extracted for video semantic segmentation usually comprise high resolution features, the generation of the full feature representation for a video frame computed using equation (6) may incur a relatively high computation cost. To reduce computational costs, in certain embodiments, attention propagation subsystem 146 is configured to downsample the inputs received from the encoders using a downsampling technique to generate downsampled versions of the value feature maps, query maps and key maps generated by each of the encoders prior to computing the affinity value between pixels of a current video frame t and the previous (m−1) video frames. In certain implementations, the downsampling technique comprises applying a spatial pooling operation $\gamma_n(\cdot)$ with stride n to the query, key, and value feature maps (138, 140 and 142) of the previous (m−1) video frames to generate a downsampled version $q_i$ of the value feature map, a downsampled version $k_i$ of the key feature map and a downsampled version $v_i$ of the value feature map as shown in equation (7) below:

$$q_i = \gamma_n(Q_i), \; k_i = \gamma_n(K_i), \; v_i = \gamma_n(V_i) \quad \text{(Equation 7)}$$

With these downsampled maps, the complexity for equation 5 decreases to $$O\left(\frac{(m-1)d_k H^2 W^2}{n^2}\right)$$

For instance, as shown in FIG. 1, attention propagation subsystem 146 may apply a downsampling technique to generate a downsampled sub feature map 148 (comprising a downsampled version $q_{t−3}$ of the query feature map, a downsampled version $k_{t−3}$ of the key feature map and a down sampled version $v_{t−3}$ of the value feature map) corresponding to sub feature map 138. In a similar manner, attention propagation subsystem 146 may apply a downsampling technique to generate downsampled sub feature maps 150 and 152 corresponding to sub feature maps 140 and 142 respectively.

According to another attention propagation technique for generating the full feature representation for a video frame, instead of computing the affinity between the current video frame t and all previous (m−1) video frames received immediately prior to the current frame t as part of video signal 104, attention propagation subsystem 146 may restrict computation to the neighboring frames and then propagate the results to the current frame. For example, attention values and the merging may be performed between neighboring (adjacent) video frames within the window of frames being processed (i.e, frame t through frame (t−m+1)). In certain embodiments, the "attention value" measures the correlation between pixels of the adjacent video frames. This not only reduces the number of attention maps that have to be computed, but it also restricts attention computation to adjacent frames, where motion is smaller. For instance, given a window of a contiguous sequence of video frames composed of video frames from (t−m+1) to t together their respective downsampled Query, Key, and Value maps, for an intermediate video frame p∈(t−m+1,t), the attention value between pixels of the intermediate video frame p and pixels of the current video frame t is propagated as shown in equation (8) below:

$$v'_p = \phi\left(\text{Softmax}\left(\frac{q_p k_{p-1}^T}{\sqrt{d_k}}\right)v'_{p-1}\right) + v_p \quad \text{(Equation 8)}$$

Where
  m is the number of sub-neural networks implemented by VSSS 102,
  $v'_{t-m+1} = \gamma_n(V_{t-m+1})$,
  q, k, and v are the downsampled maps as in Eq. (5),
  $d_k$ is the number of dimensions for Query and Key, and
  $\phi_p$ is a 1×1 convolutional layer.

The final feature representation is then used to compute a full feature representation for the current video frame as shown in equation (9) below:

$$V'_t = \phi\left(\text{Softmax}\left(\frac{Q_t k_{t-1}^T}{\sqrt{d_k}}\right)v'_{t-1}\right) + V_t, \quad \text{(Equation 9)}$$

and segmentation maps are generated by:

$$S_m = \pi_m(V'_m) \quad \text{(Equation 10)}$$

where $\pi_m$ is the final prediction layer associated with sub-neural network m.

By computing the affinity value using equation (8) and the full feature representation of the video frame using equation (9), the time complexity is reduced to $$O\left(\frac{(m-2) \cdot d_k H^2 W^2}{n^4} + \frac{d_k H^2 W^2}{n^2}\right) \approx O\left(\frac{d_k H^2 W^2}{n^2}\right).$$

Here, n is the downsampling rate, m is the size of the temporal window, $d_k$ is the number of channel for query and key feature maps, H and W represents height and width of the feature maps respectively. Since the attention is extracted only from neighboring video frames, the resulting full feature representation obtained for each video frame is also more robust to scene motion. Additional details of the processing performed by attention propagation subsystem 146 to compute a full feature representation for a current video frame based on computing attention values between neighboring (adjacent) video frames received as part of a contiguous sequence of video frames using equations (8) and (9) are described below with reference to FIG. 4.

In certain embodiments, the full feature representation 159 (i.e., the full set of features to be used for segmenting) generated for a video frame is then used for segmenting the video frame. Segmentation subsystem 162 is configured to segment each video frame based on the full feature representation generated for the video frame by attention propagation subsystem 146 (e.g., obtained using either equation (6) or (9)). In a certain implementation, segmentation subsystem 162 is configured to generate a segmentation map for each video frame as shown in equation (10) below: $S_m = \pi_m(V'_m)$ where $\pi_m$ is the final prediction layer associated with sub-neural network m. Segmentation subsystem 162 is configured to identify a label for each pixel of the current video frame based upon the full feature representation.

In certain embodiments, segmenting a video frame comprises, for each pixel in the video frame, based upon the full feature representation 159 selecting, from a set of multiple classifications or labels, a particular classification or label to be associated with the pixel. The segmentation information (labels associated with the pixels in the video frame) for the video frame may then be output. In certain embodiments, a color may be associated with each label in the set of labels. In such an embodiment, VSSS 102 may output segmentation information for an image of a video frame by coloring the pixels of the video frame, where a pixel in the frame is associated with or colored with a color corresponding to label determined for and associated with that pixel. The embodiment shown in FIG. 1 illustrates a segmentation result 160 generated by segmentation subsystem 162 for current video frame (t) 112 based on the full feature representation 158 computed for current video frame (t) 112 by attention propagation subsystem 146. In certain examples, the segmentation result 160 may be displayed to a user via a user interface of VSSS 102.

Computing environment 100 depicted in FIG. 1 is merely an example and is not intended to unduly limit the scope of claimed embodiments. Various alternatives and modifications are possible. For example, in some implementations, VSSS 102 can be implemented using more or fewer subsystems than those shown in FIG. 1, may combine two or more subsystems, or may have a different configuration or arrangement of subsystems. The use of neural networks in the description above is not meant to be limiting. In alternative embodiments, other predictive computation models such as other machine learning models may be used.

Figure 3:
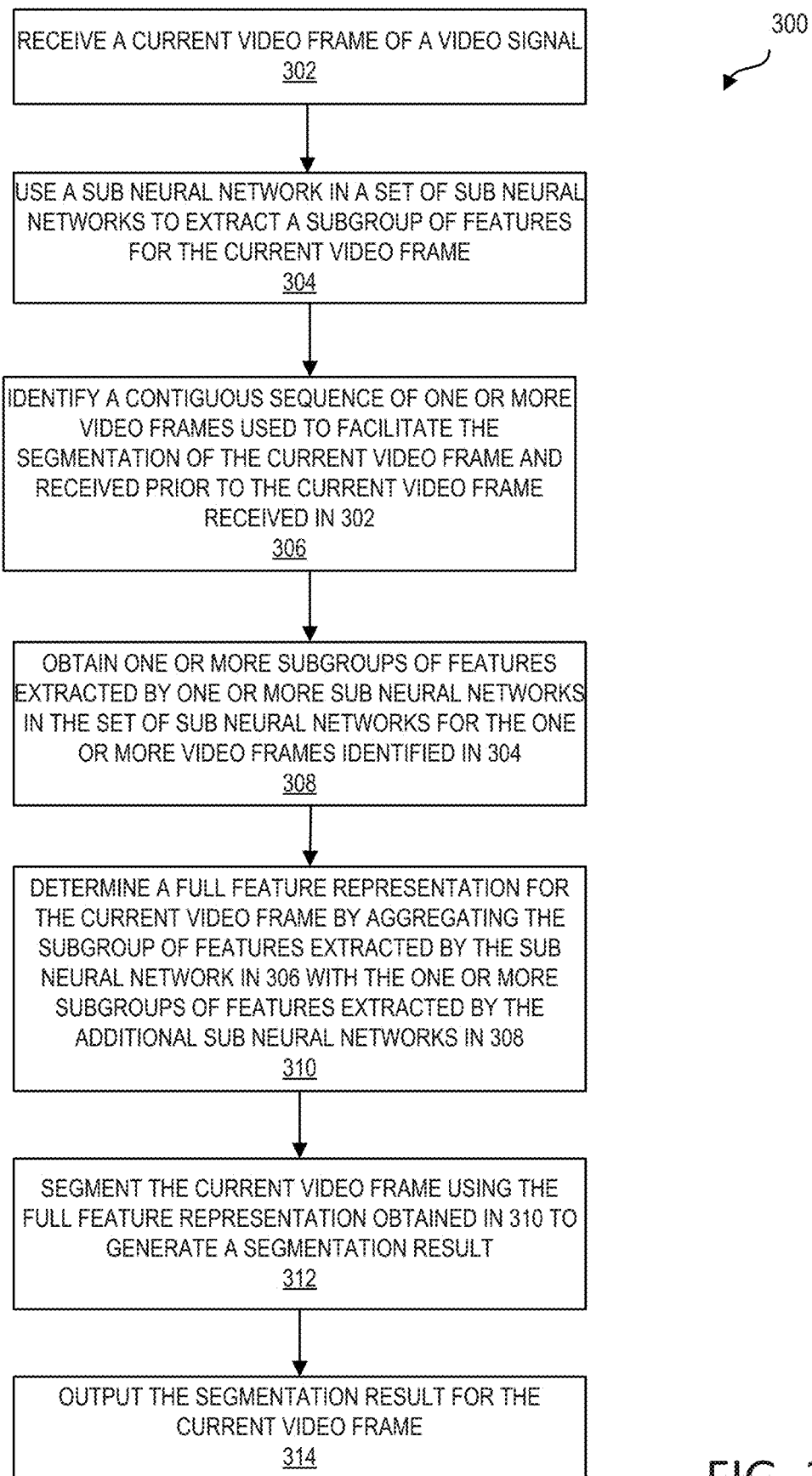
FIG. 3 depicts an example of a process for determining a full feature representation for video frames received as part of a contiguous sequence of video frames of a video signal by the Video Semantic Segmentation System shown in FIG. 1, according to certain embodiments.

FIG. 3 depicts an example of a process 300 for segmenting a video frame received in a video signal according to certain embodiments. The processing depicted in FIG. 3 may be repeated for each of the video frames in a video signal to perform segmentation of the video signal. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by VSSS 102. For purposes of describing the processing depicted in FIG. 3, it is assumed that there are a total of "m" sub-neural networks in the VSSS, each of the "m" sub-neural networks trained to extract a particular group of features from a video frame.

The per-video frame processing depicted in FIG. 3 and described below may be triggered when VSSS 102 receives a video for segmentation. At block 302, VSSS 102 receives a current video frame (t) (e.g., 112) of a video signal (e.g., 104) at time T.

At block 304, a particular sub-neural network from a set of multiple sub-neural networks processes the current video frame (t) and a group of features for the current video frame that the particular sub-neural network is trained to extract. For example, as shown in FIG. 1, sub-neural network 120 processes and extracts a group of features for a current video frame (t) 112.

At block 306, a contiguous sequence of one or more video frames received by the VSSS and which are to be used to facilitate the segmentation of the current video frame are identified. In certain embodiments, a contiguous sequence of video frames received by the VSSS immediately prior to the current video frame (t) received in block 302, are identified in 306. The number of previously received video frames identified in 306 depends upon the number of sub-neural networks ("m") provided by the VSSS for features extraction, which in turn is dependent upon the number of groups of features that the feature space to be used for segmentation the video frames is divided into. In certain implementations, given "m" sub-neural networks, (m−1) video frames received immediately prior to the current frame (t) are identified in 306. Assuming that the current frame (t) is received at time (T), then the contiguous sequence of video frames identified in 306 includes video frames received from a time (T−m+1) to time (T−1). For example, as shown in FIG. 1, given four sub-neural networks, for a frame (t) received at time (T), frames (t−1), (t−2), and (t−3) received at times (T−1), (T−2), and (T−3), respectively, are identified in 306.

At block 308, sub-neural networks, other than the sub-neural network used for the processing in 304, are used to extract different groups of features from the frames identified in 306. As part of 308, (m−1) sub-neural networks, not including the sub-neural network that processed the frame (t) in 304, are used to process the video frames identified in 306 and extract groups of features from the video frames. For instance: frame (t−1) is processed by a first sub-neural network from the (m−1) sub-neural networks and the first sub-neural network extracts a particular group of features from frame (t−1) that the sub-neural network is trained to extract; frame (t−2) is processed by a second sub-neural network from the (m−1) sub-neural networks and the second sub-neural network extracts a particular group of features from frame (t−2) that the second sub-neural network is trained to extract; frame (t−3) is processed by a third sub-neural network from the (m−1) sub-neural networks and the third sub-neural network extracts a particular group of features from frame (t−3) that the third sub-neural network is trained to extract; and continuing so on for until all of frames (t−1) through (t−m+1) have been processed. For example, as shown in FIG. 1, assuming "m" is equal to 4, a first sub-neural network 114 is configured to extract a first group of features for video frame (t−3) 106 received at time (T−3), a second sub-neural network 116 is configured to extract a second group of features for video frame (t−2) 108 received at time (T−2), and a third sub-neural network 118 is configured to extract a third group of features for video frame (t−1) 110 received at time (T−1). In certain embodiments, the processing in block 308 includes generating Q, K, and V maps for each video frame that is processed for extracting groups of features.

At block 310, a full feature representation for the current video frame (t) (e.g., frame 112 in FIG. 1) is generated based upon the groups of features extracted from the current frame (t) in 304 and the groups of features extracted in 308 for the one or more video frames identified in 306. In certain embodiments, the full feature representation for the current frame (t) is generated by aggregating the groups of features extracted from the current frame (t) in 304 and the groups of features extracted in 308 for the one or more video frames identified in 306. Various different aggregation techniques may be used. As discussed above in relation to FIG. 1, in a certain implementation, attention propagation subsystem 146 within VSSS 102 is configured to determine the full feature representation 148 for a current video frame (t) 112 received at time T by aggregating the value feature maps extracted from video frames (t−3) 106, (t−2) 108 and (t−1) 110 received at times (T−3), (T−2), and (T−11), respectively, with the value feature map of the current video frame (t) 112 received at time T. In certain examples, the full feature representation for a video frame is determined using equation (6) by computing an affinity value between the pixels of a current video frame and the pixels of one or more previous video frames received prior to the current video frame as part of the contiguous sequence of video frames. In other examples, the full feature representation for a video frame is determined using equation (9) by computing attention values between neighboring (adjacent) video frames received as part of the contiguous sequence of video frames. Additional details of the process used by VSSS 102 for determining a full feature representation for a video frame by computing attention values between adjacent video frames received as part of a contiguous sequence of video frames is described in FIG. 4.

At block 312, the current video frame (t) is segmented using the full feature representation obtained for the frame in block 310. A segmentation result 160 is generated as a result of the segmentation processing. The segmentation result comprises segmentation information, where the segmentation information includes information identifying, for each pixel in the current frame (t), a label or classification associated with that pixel where the label or classification is selected from a set of multiple preconfigured labels or classification categories. In certain embodiments, a color may be associated with each label in the set of labels. In such an embodiment, the segmentation result (e.g., 160 in FIG. 1) may be the current video frame (t) with each pixel in the current frame being colored using a color corresponding to the label associated with that pixel. In certain embodiments, each pixel in the current video frame may be associated with a label that is representative of the content represented by the pixel in the current video frame. For example, a pixel present in an area of the current video frame depicting a car may be associated with a "car" label; a pixel present in an area of the current video frame depicting the road may be associated with a "road" label; a pixel present in an area of the current video frame depicting the sky may be associated with the "sky" label; and so on.

At block 314, the segmentation result generated for the current video frame (t) in 312, and which includes the segmentation information, may be output to a user. For example, the segmentation information may be output via a user interface of VSSS 102. In some applications, the segmentation information may be provided to a downstream process for further analysis. For example, in an autonomous driving application, the segmentation information may be used by a downstream process or application to autonomously drive a vehicle. As another example, in an image analysis context, the segmentation information may be used by a downstream process or application that is configured to identify objects present in the current video frames.

Figure 4:
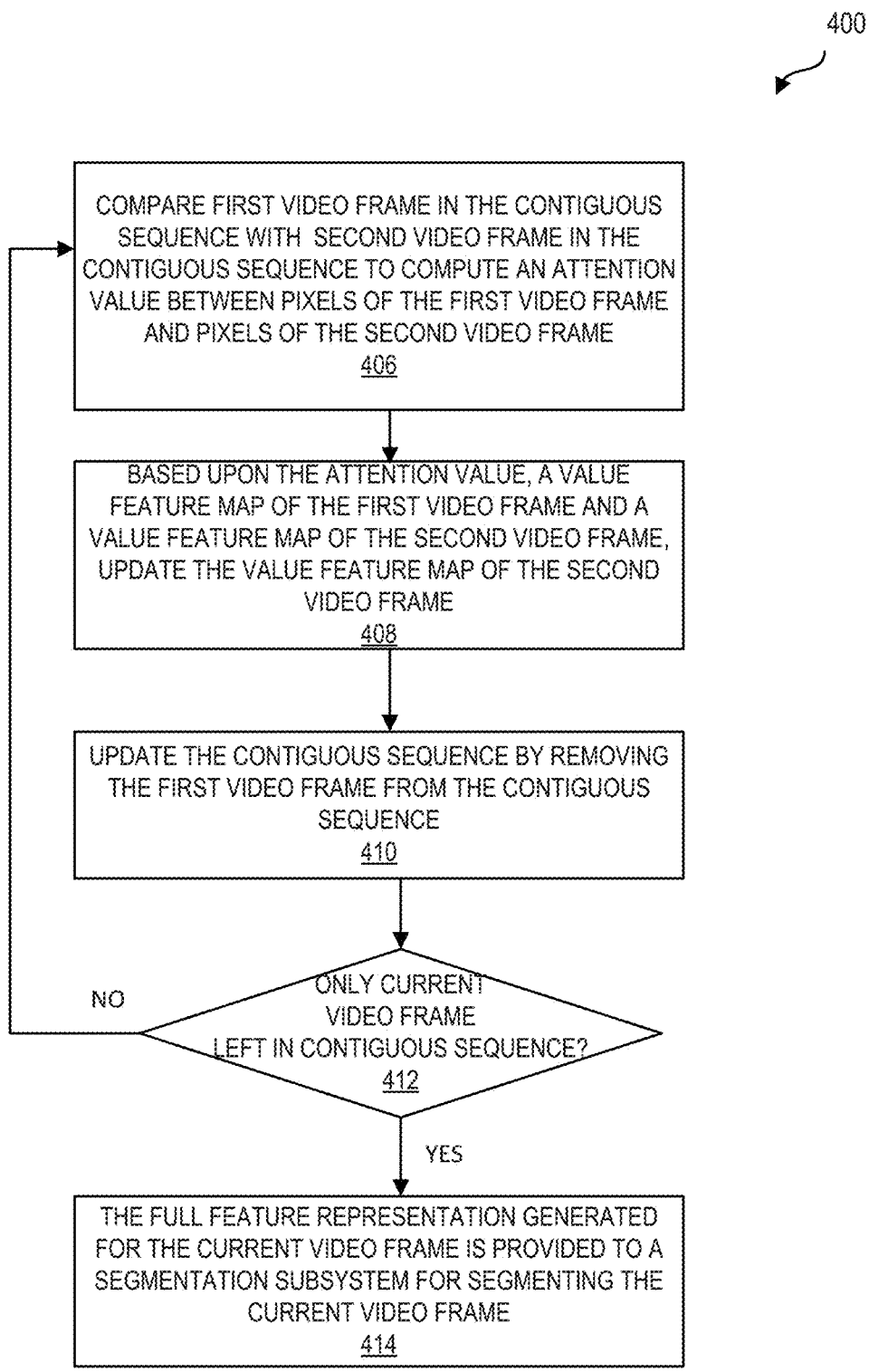
FIG. 4 depicts an example of a process for generating a full feature representation for a current video frame, according to certain embodiments.

FIG. 4 depicts an example of a process 400 for generating a full feature representation for a current video frame according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by attention propagation subsystem 146 of VSSS 102.

In certain embodiments, the processing depicted in FIG. 4 and described below is performed in block 310 in FIG. 3. Accordingly, prior to the processing depicted in FIG. 4 and described below, it is assumed, a group of features has been extracted for a current video frame and groups of features have also been extracted for a contiguous sequence of video frame to be used for segmenting the current video frame per blocks 304, 306, and 308 depicted in FIG. 3. The processing depicted in FIG. 4 and described below is then used to generate full feature representation for the current video frame.

For the processing depicted in FIG. 4 and described below, the current video frame is added to the sequence of video frames identified in 306 to generate an updated sequence that includes the current video frame. From a temporal perspective, the current video frame (t) received at time (T) is the last frame in the updated sequence and the frame (t−m+1) received at time (T−m+1) is the first video frame in the updated sequence. At block 406, the first video frame in the updated contiguous sequence is compared with the second video frame in the updated contiguous sequence to compute an attention value between pixels of the first video frame and pixels of the second video frame. The first and second video frames are adjacent to each other in the updated sequence. In certain examples, the processing at block 406 may be performed by attention propagation subsystem 146 by using a first attention propagation function 154 to compute the first attention value between pixels of the first video frame in the contiguous sequence and the pixels in the second video frame in the contiguous sequence.

In certain implementations, first attention propagation function 154 computes a first attention value between the pixels of two adjacent video frames (i.e., the first video frame and the second video frame) using the affinity value shown in equation (8). For instance, using the embodiment depicted in FIG. 1 as an example, the updated sequence of video frames comprises, in order: {frame(t−3), frame(t−2), frame(t−1), frame(t)}. Accordingly, in the first iteration of the flowchart in FIG. 4, frames(t−3) 106 and (t−2) 108 are compared to each other to compute attention values between the pixels in the two video frames. The first attention propagation function 154 computes a dot product of the q values of the (downsampled) Query map (e.g., $q_{t-3}$) of video frame (t−3) 106 and the k values of the (downsampled) Key map (e.g., $k_{t-2}$) of video frame (t−2) 108 to compute the first attention value.

At block 408, based on the comparing performed at block 406, the value feature map of the second video frame is updated based upon the value feature map of the first video frame and the value feature map of the second video frame prior to the updating. In certain examples, the processing at block 408 involves using the first attention value computed in block 406 to weight the 'v' values of the (downsampled) value feature of the first video frame (t−3) 106. The weighed 'v' values of the value feature map of the first video frame are then added to the (downsampled) value feature map of the second video frame to update the value feature map of the second video frame. In certain examples, the updated value feature map for the second video frame may be computed using equation (9) described above.

For example, as described above, for the example depicted in FIG. 1, in the first iteration, frames (t−3) and (t−2) are compared in block 406. Then, the 'v' values of the (downsampled) value feature map $V_{t-3}$ of the first video frame (t−3) 106 are weighed using the first attention value computed in block 406. The weighed 'v' values of the value feature map $V_{t-3}$ of the first video frame are then added to the (downsampled) value feature map $V_{t-2}$ of the second video frame (t−2) 108 to update the value feature map $V_{t-2}$ of the second video frame (T−2) 108. This update is done using equation (9) described above.

At block 410, the first video frame processed in 406 is removed from the updated sequence of video frames. Using the example, in FIG. 1, in the first iteration, video frame (t−3) is removed from the updated sequence {frame(t−3), frame(t−2), frame(t−1), frame(t)} to generate an updated sequence {frame(t−2), frame(t−1), frame(t)}.

At block 412, a check is made to determine if there is only one frame remaining in the updated sequence. If yes, then this last remaining frame is the current frame and processing continues with block 414. If no, then it means that there are more frames to process and processing continues with block 406 wherein the first and second adjacent frames in the updated sequence are compared to compute an attention value between the frames.

Continuing with the example of FIG. 1, after the first iteration, the updated sequence, in order, is made up of {frame(t−2), frame(t−1), frame(t)}. In the second iteration, frames (t−2) and (t−1), representing the first and second adjacent frames in the updated sequence, are compared in 406 and an attention value computed. An attention propagation function 156 may be used to compute the attention value between the pixels of adjacent video frames (t−2) 108 and (t−1) 110 using the affinity value shown in equation (8) that computes a dot product of the q values of the (downsampled) query map (e.g., $q_{t−2}$) of video frame (t−2) 108 and the k values of the (downsampled) key map (e.g., $k_{t−1}$) of video frame (t−1) 110 to compute the attention value between the two video frames. The attention value computed for frames (t−2) and (t−1) is then used to weight the 'v' values of the (downsampled) value feature map $V_{t−2}$ of video frame (t−2) 108. The weighed 'v' values of the value feature map of video frame (t−2) 108 are then added to the (downsampled) value feature map $V_{t−1}$ of video frame (t−1) 110 to generate an updated value map for video frame (t−1) 110. Frame (t−2) is then removed from the updated sequence. The updated sequence thus becomes {frame(t−1), frame(t)}. The check in 412 then determines that there are multiple frames remaining in the updated sequence and processing continues back to 406.

Continuing with the example of FIG. 1, after the second iteration, the updated sequence, in order, is made up of {frame(t−1), frame(t)}. In the third iteration, frames (t−1) and (t), representing the first and second adjacent frames in the updated sequence, are compared in 406 and an attention value computed. An attention propagation function 157 may be used to compute the attention value between the pixels of adjacent video frames (t−1) 110 and (t) 112 using the affinity value shown in equation (8) that computes a dot product of the q values of the (downsampled) query map (e.g., $q_{t−1}$) of video frame (t−1) 110 and the k values of the key map (e.g., $k_t$) of video frame (t) 112 to compute the attention value between the two video frames. The attention value computed for frames (t−1) and (t) is then used to weight the 'v' values of the (downsampled) value feature map $V_{t−1}$ of video frame (t−1) 110. The weighed 'v' values of the value feature map of video frame (t−1) 110 are then added to the value feature map $V_t$ of video frame (t) 112 to generate an updated value map for video frame (t) 112. In certain embodiments, such as the embodiment shown in FIG. 1, the value feature map $V_t$ of the current video frame 112 is computed using the original value feature map ($V_t$) of the current video frame (t) 112 and not its downsampled version. However, in other embodiments, the value feature map $V_t$ of the current video frame 112 may be computed by first obtaining the downsampled version of the value feature map of the current video frame (t) 112. In certain examples, the updated value feature map $V_t$ for the current video frame 112 may be computed using equation (9) shown above and represents the full feature representation for the current frame.

Frame (t−1) is then removed from the updated sequence. The updated sequence thus becomes {frame(t)}. The check in 412 then determines that there is only one video frame remaining in the updated sequence and processing proceeds to block 414.

When it is determined in 412 that only one video frame, i.e., the current video frame (t) remains in the updated sequence, the value map $V_t$ of the current video frame (t) represents the full feature representation that has been generated from the iterative processing in blocks 406, 408, and 410. The full feature representation represents the result of combination or aggregation or accumulation of the features from the previous video frames in the sequence with the current video frame, while taking into consideration the attention values computed between adjacent pixels, where the attention value takes into consideration the correlations between pixels across the adjacent video frames in the contiguous sequence. The full feature representation encapsulates all the features (i.e., the full feature space) to be used for segmenting the current video frame. At block 412, the (updated) value feature map ($V_t$) of the current video frame (t) that represents the full feature representation for the current frame is provided to a downstream process for processing. For example, the full feature representation is provided to segmentation subsystem 162 for segmenting the current video frame. Segmentation subsystem 162 may then perform processing to segment the current video frame (t) 112 using the full feature representation obtained in block 412 to generate a segmentation result as described above for blocks 312 and 314 in FIG. 3.

Training of the Sub-Neural Networks

As described above, a set of sub-neural networks are used to extract groups of features from a set of contiguous video frames including a current video frame that is to be segmented. Each sub-neural network is a neural network that is trained using training data. In certain embodiments, a knowledge distillation strategy is used for training the sub-neural networks. Using this strategy, a strong deep model designed for single images is used as the teacher network. In addition to transferring knowledge in the full feature space, a grouped knowledge distillation loss is used to further transfer knowledge at the features subspace level in order to make the information extracted from different paths (i.e., using the diff sub-neural networks) more complementary to each other.

Figure 5:
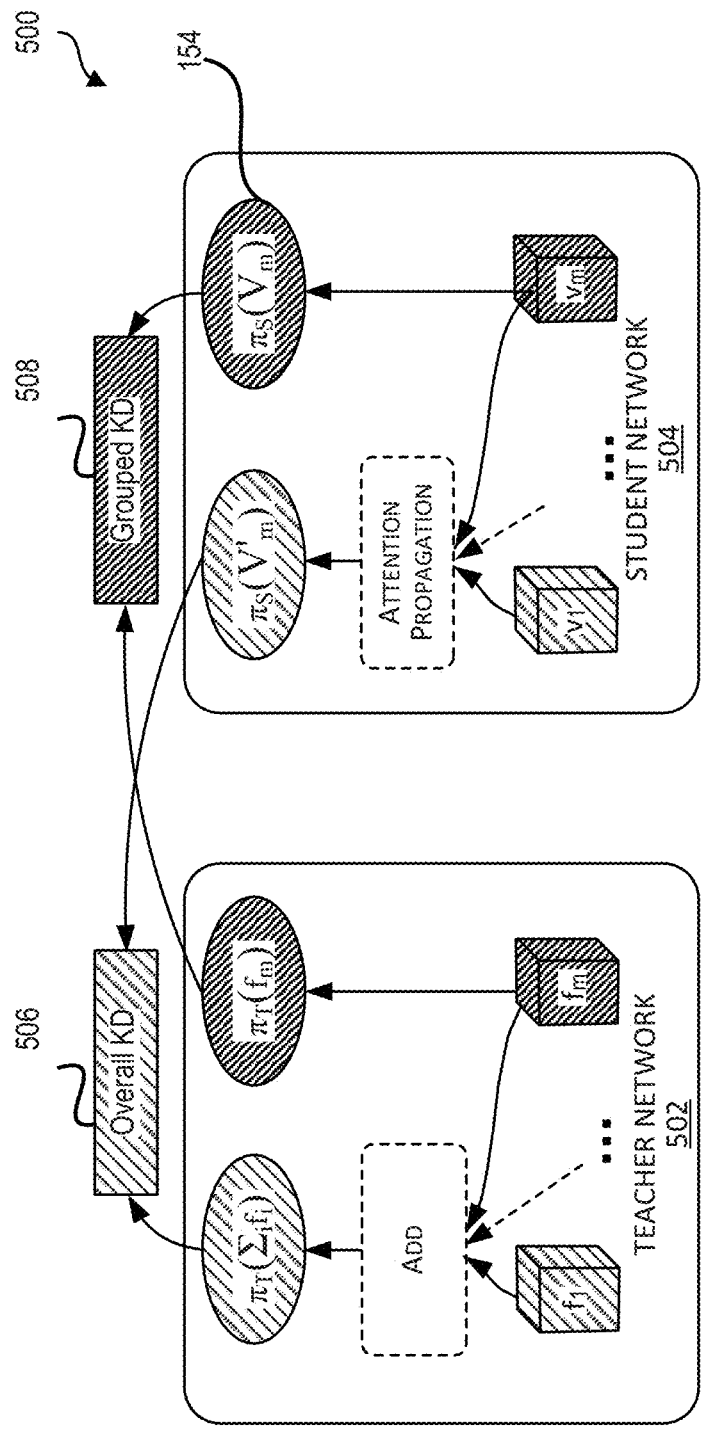
FIG. 5 is an example computing environment used by the Video Semantic Segmentation System of FIG. 1 for training a set of sub-neural networks, according to some embodiments.

FIG. 5 depicts the concept of a grouped distillation loss technique for training the set of sub-neural networks according to some embodiments. As shown in FIG. 5, a deep baseline model (e.g., PSPNet101) is used as the teacher 502 and the "m" sub-neural networks are the student network 504. The teacher network 502 may have been trained to extract features in the full features space. This training may be performed using various techniques, including, for example, using a training dataset comprising a set of training images (e.g., video frames) along with their full set of features to be used for segmenting.

The deep learning model acts as a teacher network 502 for training a student network 504 comprising the set of sub-neural networks. The goal of the distillation training is to not only align the output distributions at the whole model level, but also at a subspace group level. Using the technique of block matrix multiplication, the teacher network's feature reduction layer is separated into m independent sub-convolution groups, which output a set of feature groups (subspaces of features) $\{f_i | i=1, \ldots, m\}$ depicted in FIG. 5 in teacher network 502. The original segmentation result output by the teacher network is $\pi_T(\Sigma\ f)$, and the contribution of the i-th feature group is $\pi_T(f_i)$, given $\pi_T(\bullet)$ being the teacher network's segmentation layer. In the student network comprising the set of sub-neural networks, the target video frame's (i.e., the video frame that is to be segmented) Value map $V_m$ is combined with propagated previous information (i.e., the value maps from other video frames in the sequence of video frames to be used for segmenting the target frame) to be $V'_m$. Thus the full model output for the student network 504 is $\pi_S(V'_m)$ and the m-th feature path's contribution is $\pi_S(V_m)$, given $\pi_S(\bullet)$ is the final segmentation layer. Based on the above information, the final loss function to be minimized is shown in equation (10) below:

$$\text{Loss} = \text{CE}(\pi_S(V'_i, \text{gt})) + \alpha \cdot KL(\pi_S(V'_i) \| \pi_T(\Sigma f)) + \beta \cdot KL(\pi_S(V_i) \| \pi_T(f_i)) \qquad (11)$$

where CE is the cross entropy loss, and KL refers to the KL-divergence. The first term is the supervised training with ground truth. The second term distills knowledge at the whole-model level. The third term transfers knowledge at feature groups level. In a certain implementation, the parameters $\alpha$ and $\beta$ are each set to a value of 0.5.

In the embodiment shown in FIG. 5, the knowledge distillation loss technique comprises an overall knowledge distillation (Overall KD) approach 506 and a grouped knowledge distillation (Grouped KD) approach 508. In certain embodiments, Overall KD approach 506 involves aligning the full outputs between teacher network 502 and student network 504. In other words, Overall KD approach 506 attempts to minimize the error (or loss) between the full feature set (denoted by $\pi_T(\Sigma\ \text{ifi})$) extracted by teacher network 502 and the union of the groups of features (denoted by $\pi_S(V'_m)$) output by the individual sub-networks in student network 504.

In certain embodiments, Grouped KD approach 508 involves matching the outputs of each individual sub-network to the teacher network's output conditioned on the respective feature subspace. In other words, Grouped KD approach 508 attempts to minimize the error (or loss) between a feature group extracted by a particular sub layer of teacher network 502 (denoted by $\pi_T(f_m)$) to the feature group extracted by a sub-network in student network 504 (denoted by $\pi_S(V_m)$), where 'm' refers to the "$m^{th}$" sub-network in the student network. To further improve efficiency, using the technique of block matrix multiplication, the convolutional layer of the deep learning model is converted for dimension reduction to the summation of series of convolution operations at the subspace level, which enables the distribution of the subspace-level convolution operations to their respective sub-neural networks. As a result, the output of the dimension reduction layers are recomposed simply by addition, before being used in the prediction head of the network. Keeping a similar total model size to the original deep model, aggregating multiple sub-neural network paths can have a similarly strong representational power as the original deep model.

Examples of Experimental Results

As described above, the present disclosure describes techniques for performing fast and accurate video semantic segmentation using a set of temporally distributed neural networks. This is validated by several experiments run using some of the embodiments described herein. The results of these experiments validate that the techniques disclosed herein performs both fast and accurate video semantic segmentation using a video semantic segmentation system (e.g., VSSS 102 depicted in FIG. 1) as described above. A high level of accuracy is retained while significantly improving the efficiency and latency of processing video frames compared to conventional video segmentation systems. Experiments were performed comparing the performance (based upon the level of accuracy and speed of processing) of VSSS 102 with different deep model-based conventional segmentation techniques. The method used by VSSS was evaluated on different datasets such as the Cityscapes and Camvid datasets for street views and NYUDv2 dataset for indoor scenes. Various neural network models such as PSPNet, BiseNet, etc. were used as the temporally distributed set of sub neural networks (for instance, 114, 116, 118 and 120 shown in FIG. 1). Collectively, the sub-neural networks are referred to herein as "TDNet" of VSSS 102. Experiments were conducted using various shallow architectures for the TDNet including the following:

(a) $TD^2$-PSP50: In this TDNet model, two sub-neural networks were used, each having PSPNet-50 (50 layers) backbones with halved output channels;

(b) $TD^4$-PSP18: In this TDNet model, four sub-neural networks were used, each consisting of a PSPNet-18 (18 layers) neural network;

(c) $TD^2$-Bise34: In this TDNet model, two sub-neural networks were used, each consisting of a BiseNet-34 (34 layers) neural network; and (d) $TD^4$-Bise18: In this TDNet model, four sub-neural networks were used, each consisting of a BiseNet-18 (18 layers) neural network.

The performance of the various TDNet models described above were compared to performances of various traditional deep learning models using for video segmentation. The results indicated that the mean performance of the TDNet models (e.g., $TD^2$-PSP50, $TD^4$-PSP18, $TD^2$-Bise34, $TD^4$-Bise18) is at least comparable and many times better that performance of the traditional single deep models (e.g., PSPNet-101 and BiseNet-101) used for video segmentation. All these models were trained using the same hyper-parameters and a batch size of 1. Experimenters trained the above models TDNet models (e.g., $TD^2$-PSP50, $TD^4$-PSP18, $TD^2$-Bise34, $TD^4$-Bise18) and baselines conventional models (i.e., deep learning models PSPNet and BiseNet) with pre-trained parameters and then trained the models to convergence to achieve the best performance. To train the TDNet baseline model with m subnetworks, each training sample was composed of m consecutive frames and the supervision is the ground truth from the last sub neural network in the m sub-networks. Experimenters performed random cropping, random scaling and flipping for data augmentation. Networks were trained by stochastic gradient descent with momentum 0.9 and a weight decay of 5e-4 for 80 k iterations. The learning rate was initialized as 0.01 and decayed by $$\left(1 - \frac{iter}{\max - iter}\right)^{0.9}.$$

During testing, experimenters resized the output to the input's original resolution for evaluation. On certain types of datasets (e.g., Cityscapes and NYUDv2) which have temporally sparse annotations, experimenters computed the accuracy for all possible orders of sub-neural networks and averaged them as final results. Experimental results indicated that different orders of sub-neural networks achieved very similar mIoU values, which indicates that TDNet is stable with respect to sub-feature paths (i.e., groups of features).

Evaluation of Results using the Cityscapes Dataset

Experimenters compared the various TDNet models with previous models for semantic video segmentation and the results are shown in Table 1.

TABLE 1

| Method | mIoU(%) val | mIoU(%) test | Speed (ms/f) | Max Latency (ms) |
|---|---|---|---|---|
| CLK [39] | 64.4 | — | 158 | 198 |
| DFF [57] | 69.2 | — | 156 | 575 |
| GRFP(5) | 73.6 | 72.9 | 255 | 255 |
| LVS-LLS | 75.9 | — | 119 | 119 |
| PEARL | 76.5 | 75.2 | 800 | 800 |
| LVS | 76.8 | — | 171 | 380 |
| PSPNet18 | 75.5 | — | 91 | 91 |
| PSPNet50 | 78.1 | — | 238 | 238 |
| PSPNet101 | 79.7 | 79.2 | 360 | 360 |
| TD $^4$-PSP18 | 76.8 | 76.4 | 85 | 85 |
| TD $^2$-PSP50 | 79.9 | 79.3 | 178 | 178 |

The first columns "Method" identifies the model used. The novel TDNet models that were used for this experiment include TD$^4$-PSP18 and TD$^2$-PSP50; the other models are all conventional deep single neural network models. The second column identifies the mIoU accuracy that identifies the percentage of pixels in the image that were classified correctly by the model, the third column identifies the speed of computation of the model and the fourth column identifies the latency of the model.

As can be seen from Table 1, the TDNet embodiments are accurate and fast when compared to conventional techniques. For example, compared with the LVS model, the TD$^4$-PSP18 model achieves similar performance with only a half the average time cost, and TD$^2$-PSP50 further improves accuracy by 3% in terms of mIoU. Unlike previous key frame-based methods like LVS, ClockNet and DFF that have fluctuating latency between key frames and non-key frames (e.g. 575 ms vs. 156 ms for DFF), the disclosed method runs with a balanced computation load over time. With a similar total number of parameters as PSPNet101, TD$^2$-PSP50 reduces the per-frame time cost by half from 360 ms to 178 ms while improving accuracy. The sub-networks in TD$^2$-PSP50 are adapted from PSPNet50, so experimenters also compared their performance, and based on the comparison, the results indicated that that TD$^2$-PSP50 outperforms PSPNet50 by 1.8% mIoU with a faster average latency. As shown in the last row of Table-1, TD$^4$-PSP18 can further reduce the latency to a quarter, but due to the sub-neural networks (based on a PSPNet18 model), the performance drops compared to PSPNet101. However, it still achieves state-of-the-art accuracy and outperforms previous methods by a large gap in terms of latency.

To validate the disclosed method's effectiveness for more realistic tasks, experimenters evaluated the real-time models TD$^2$-Bise34 and TD$^4$-Bise18 (shown in Table 2).

TABLE 2

| Method | mIoU(%) val | mIoU(%) test | Speed (ms/f) |
|---|---|---|---|
| ICNet | 67.7 | 69.5 | 20 |
| LadderNet | 72.8 | — | 33 |

TABLE 2-continued

| Method | mIoU(%) val | mIoU(%) test | Speed (ms/f) |
|---|---|---|---|
| SwiftNet | 75.4 | — | 23 |
| BiseNet *18 | 73.8 | 73.5 | 20 |
| BiseNet *34 | 76.0 | — | 27 |
| BiseNet *101 | 76.5 | — | 72 |
| TD $^4$-Bise18 | 75.0 | 74.6 | 21 |
| TD $^2$-Bise34 | 76.7 | — | 26 |

The first column "Method" identifies the model used. The novel TDNet models that were used for this experiment include TD$^4$-Bise18 and TD$^2$-Bise34; the other models are all conventional deep single neural network models. The second column identifies the mIoU accuracy that identifies the percentage of pixels in the image that were classified correctly by the model, the third column identifies the speed of computation of the model.

As can be observed from Table 2, the TD$^2$-Bise34 outperforms all the previous real-time methods like ICNet, LadderNet, and SwiftNet by a large gap, at a comparable, real-time speed. With a similar total model size to BiseNet 101, TD$^2$-Bise34 achieves better performance while being roughly three times faster. TD$^4$-Bise18 drops the accuracy but further improves the speed to nearly 50 FPS. Both TD$^2$-Bise34 and TD$^4$-Bise18 improve over their single path baselines at a similar time cost, which validate the effectiveness of the disclosed TDNet model for real-time tasks.

As illustrated in Table 1 above, on average, an embodiment of VSSS 102 that utilized the TD$^4$-PSP18 sub-networks resulted in a mean Intersection over Union (mIoU) accuracy of 76.8%, a speed of 85 ms and a maximum latency of 85 ms. As used herein, the mIoU accuracy is a measure of the percentage of pixels in the image (i.e., video frame) that were correctly classified compared to the PSPNet18 deep learning model accuracy of 75.5%, speed of 91 ms and maximum latency of 01 ms. Similarly, an embodiment of VSSS 102 that utilized the TD$^2$-PSP50 network resulted in an mIoU accuracy of 79.9%, a speed of 178 ms and a maximum latency of 178 ms compared to the PSPNet50 deep learning model accuracy of 78.1%, speed of 238 ms and maximum latency of 238 ms. The experimental results shown in Table 1 additionally illustrate previous methods evaluated on different types of devices and report the speed/latency for these previous methods based on benchmark-based conversions and the experimenters re-implementations. The "Speed" and "Max Latency" in Table-1 represent the average and maximum per video frame time cost respectively. Here, speed refers to "average" time it takes for a sub-network to perform inference over a single frame and is measured in milliseconds/frame. Max latency is the maximum time it takes the sub-network to perform inference on any frame in the video, and is measured in milliseconds.

As illustrated in Table 2, on average, an embodiment of VSSS 102 that utilized the TD$^4$-BiseNet18 network resulted in an mIoU accuracy of 75% and a speed of 21 ms compared to the BiseNet18 deep learning model accuracy of 73.8% and speed of 20 ms. Similarly, an embodiment of the VSSS 102 that utilized the TD$^2$-Bise34 network resulted in an mIoU accuracy of 76.7% and a speed of 26 compared to the BiseNet34 deep learning model accuracy of 76% and speed of 27. The experimental results shown in Table 2 additionally illustrate previous methods evaluated on different types of devices and report the speed for these previous methods based on benchmark-based conversions and the experimenters re-implementations.

Evaluation of Results Using the Camvid Dataset

Experimenters also evaluated various TDNet models using a Camvid dataset. The evaluation of the results using the Camvid dataset is shown in Table 3.

TABLE 3

| Method | mIoU(%) | Mean Acc.(%) | Speed(ms/f) |
|---|---|---|---|
| LVS | — | 82.9 | 84 |
| PEARL | — | 83.2 | 300 |
| GRFP(5) | 66.1 | — | 230 |
| ACCEL | 66.7 | — | 132 |
| Netwarp | 67.1 | — | 363 |
| PSPNet18 | 71.0 | 78.7 | 40 |
| PSPNet50 | 74.7 | 81.5 | 100 |
| PSPNet101 | 76.2 | 83.6 | 175 |
| TD $^4$-PSP18 | 72.6 | 80.2 | 40 |
| TD $^2$-PSP50 | 76.0 | 83.4 | 90 |

The first column "Method" identifies the model used. The novel TDNet models that were used for this experiment include TD$^4$-PSP18 and TD$^2$-PSP50; the other models are all conventional deep single neural network models. The second column identifies the mIoU accuracy that identifies the percentage of pixels in the image that were classified correctly by the model, the third column identifies the mean accuracy of the model and the fourth column identifies the speed of the model.

It can be observed from the results shown in Table-3 that TD$^2$-PSP50 outperforms the previous state-of-the-art method Netwarp by about 9% mIoU while being roughly four times faster. Compared to the PSPNet101 baselines with a similar model capacity, TD$^2$-PSP50 reduces about half of the computation cost with comparable accuracy. The four-path version further reduces the latency by half but also decreases the accuracy. This again shows that a proper depth is useful for feature path, although even so, TD$^4$-PSP18 still outperforms previous methods with a large gap both in terms of mIoU and speed.

Evaluation of Results Using the NYUDv2 Dataset

To show the universal applicability of the techniques disclosed in this disclosure, experimenters also evaluated the indoor NYUDv2 dataset to make it suitable for the task of semantic video segmentation. As most previous methods for video semantic segmentation do not evaluate on this type of dataset, experimenters compared the disclosed method with the previous state-of-the-art method, STD2P. The results are shown in Table 4.

TABLE 4

| Method | mIoU(%) | Mean Acc.(%) | Speed(ms/f) |
|---|---|---|---|
| STD2P | 40.1 | 53.8 | >100 |
| FCN | 34.0 | 46.1 | 56 |
| DeepLab | 39.4 | 49.6 | 78 |
| PSPNet18 | 35.9 | 46.9 | 19 |
| PSPNet50 | 41.8 | 52.8 | 47 |
| PSPNet101 | 43.2 | 55.0 | 72 |
| TD $^4$-PSP18 | 37.4 | 48.1 | 19 |
| TD $^2$-PSP50 | 43.5 | 55.2 | 35 |

The first column "Method" identifies the model used. The novel TDNet models that were used for this experiment include TD$^4$-PSP18 and TD$^2$-PSP50; the other models are all conventional deep single neural network models. The second column identifies the mIoU accuracy that identifies the percentage of pixels in the image that were classified correctly by the model, the third column identifies the mean accuracy of the model and the fourth column identifies the speed of the model.

As shown in Table 4, TD$^2$-PSP50 outperforms STD2P in terms of both accuracy and speed. TD$^4$-PSP18 achieves a lesser accuracy but is more than 5 times faster. TD$^2$-PSP50 again successfully halves the latency but keeps the accuracy of the baseline PSPNet101, and also achieves about 1.6% improvement in mIoU compared to the PSPNet18 model without increasing the latency.

Method Analysis of the Training System

To show that the grouped knowledge distillation (KD) based training loss (determined using Equation 11 consistently helps to improve performance on the three datasets described above, experimenters investigated the effect of different components in the loss by training TD PSP18 with different settings. The results are shown in Table 5 below.

TABLE 5

The mIoU (%) for different components using the grouped knowledge distillation loss shown in equation 11) for TD $^4$-PSP18.

| Overall-KD | Grouped-KD | Cityscapes | NYUDv2 |
|---|---|---|---|
|  |  | 76.4 | 36.2 |
| ✓ |  | 76.5 (+0.1) | 36.7 (+0.5) |
| ✓ | ✓ | 76.8 (+0.4) | 37.4 (+1.2) |

The overall knowledge distillation works by providing extra information about intra-class similarity and inter-class diversity. Thereby, it is less effective to improve a fully trained base model on the Cityscapes dataset due to the highly-structured contents and relatively fewer categories. However, when combined with the disclosed grouped knowledge distillation approach, the performance can be still boosted with nearly a half percent in terms of mIoU. This shows the effectiveness of the grouped knowledge distillation approach to provide extra regularization. On the NYUD-v2 dataset which contains more diverse scenes and more categories, the disclosed method achieves significant improvements with an 1.2% absolute improvement in mIoU.

In the downsampling operation used to improve the efficiency of computing attention (described in FIG. 1), experimenters applied the technique of spatial max pooling with a stride n. The influence of n is shown in Table 6.

TABLE 6

Effect of different downsampling stride n on the Cityscapes dataset.

| Model | | n = 1 | 2 | 4 | 8 | 16 | 32 |
|---|---|---|---|---|---|---|---|
| *TD $^2$-PSP50 | mIoU (%) | 80.0 | 80.0 | 79.9 | 79.8 | 79.6 | 79.1 |
|  | latency (ms) | 251 | 205 | 178 | 175 | 170 | 169 |
| *TD $^4$-PSP18 | mIoU (%) | 76.9 | 76.8 | 76.8 | 76.5 | 76.1 | 75.7 |
|  | latency (ms) | 268 | 103 | 85 | 81 | 75 | 75 |
| *TD $^4$-Bise18 | mIoU (%) | 75.0 | 75.0 | 75.0 | 74.8 | 74.7 | 74.4 |
|  | latency (ms) | 140 | 31 | 21 | 19 | 18 | 18 |

The first column "Model" identifies the model used. The novel TDNet models that were used for this experiment include TD$^4$-PSP18, TD$^2$-PSP50 and TD$^4$-Bise18. The remaining columns identity values of n for each model. By increasing n from 1 to 4, it may be observed that the computation is decreased drastically, while the accuracy is fairly stable. This indicates that the downsampling strategy is effective in extracting spatial information in a sparse way. However, while further increasing n to 32, the accuracy decreases due to the information being too sparse.

Examples of Computing Environments for Implementing Certain Embodiments

Figure 6:
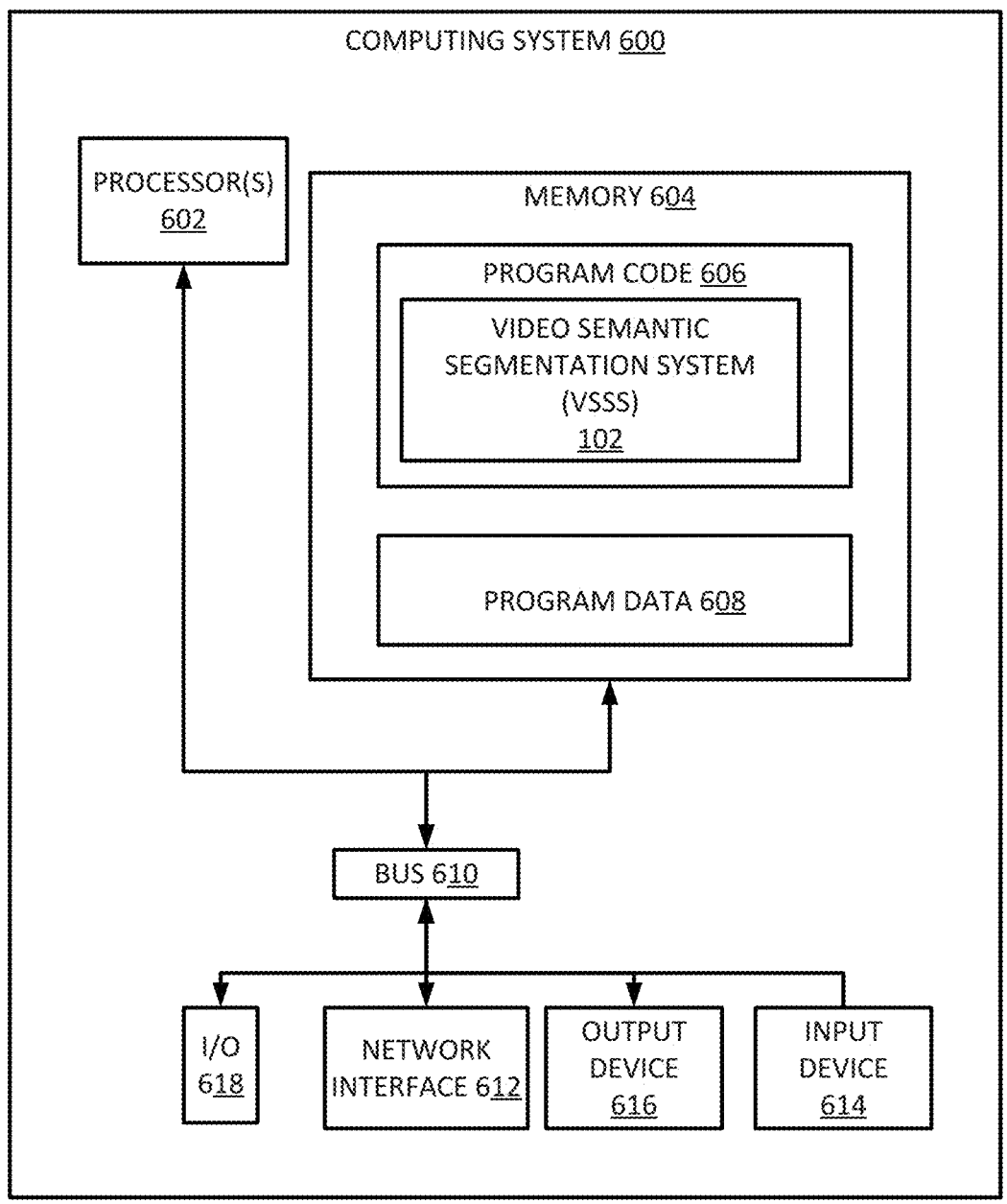
FIG. 6 depicts an example of a computing system for implementing certain embodiments of the present disclosure.

Any suitable computing system or group of computing systems can be used for performing the operations described herein. For example, FIG. 6 depicts an example of a computing system 600. VSSS 102 may be implemented using one or more computing systems 600. The depicted example of the computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing program code 606, program data 608, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 604 can be volatile memory, non-volatile memory, or a combination thereof.

The computing system 600 executes program code 606 that configures the processor 602 to perform one or more of the operations described herein. Examples of the program code 606 include, in various embodiments, VSSS 102, which may include any other suitable systems or subsystems that perform one or more operations described herein (e.g., one or more neural networks, encoders, attention propagation subsystem and segmentation subsystem). The program code 606 may be resident in the memory device 604 or any suitable computer-readable medium and may be executed by the processor 602 or any other suitable processor.

The processor 602 is an integrated circuit device that can execute the program code 606. The program code 606 can be for executing an operating system, an application system or subsystem, or both. When executed by the processor 602, the instructions cause the processor 602 to perform operations of the program code 606. When being executed by the processor 602, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 604 store the program data 608 that includes one or more datasets described herein. Examples of these datasets include segmented video frames 160. In some embodiments, one or more of data sets are stored in the same memory device (e.g., one of the memory devices 604). In additional or alternative embodiments, one or more of the programs, data sets, models, and functions described herein are stored in different memory devices 604 accessible via a data network. One or more buses 610 are also included in the computing system 600. The buses 610 communicatively couple one or more components of a respective one of the computing system 600.

In some embodiments, the computing system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computing system 600 is able to communicate with one or more other computing devices via a data network using the network interface device 612.

The computing system 600 may also include a number of external or internal devices, an input device 614, a presentation device 616, or other input or output devices. For example, the computing system 600 is shown with one or more input/output ("I/O") interfaces 618. An I/O interface 618 can receive input from input devices or provide output to output devices. An input device 614 can include any device or group of devices suitable for receiving visual, auditory, or other suitable input that controls or affects the operations of the processor 602. Non-limiting examples of the input device 614 include a touchscreen, a mouse, a keyboard, a microphone, a separate mobile computing device, etc. A presentation device 616 can include any device or group of devices suitable for providing visual, auditory, or other suitable sensory output. Non-limiting examples of the presentation device 616 include a touchscreen, a monitor, a speaker, a separate mobile computing device, etc.

Although FIG. 6 depicts the input device 614 and the presentation device 616 as being local to the computing device that executes VSSS 102, other implementations are possible. For instance, in some embodiments, one or more of the input device 614 and the presentation device 616 can include a remote client-computing device that communicates with VSSS 102 via the network interface device 612 using one or more data networks described herein.

Figure 7:
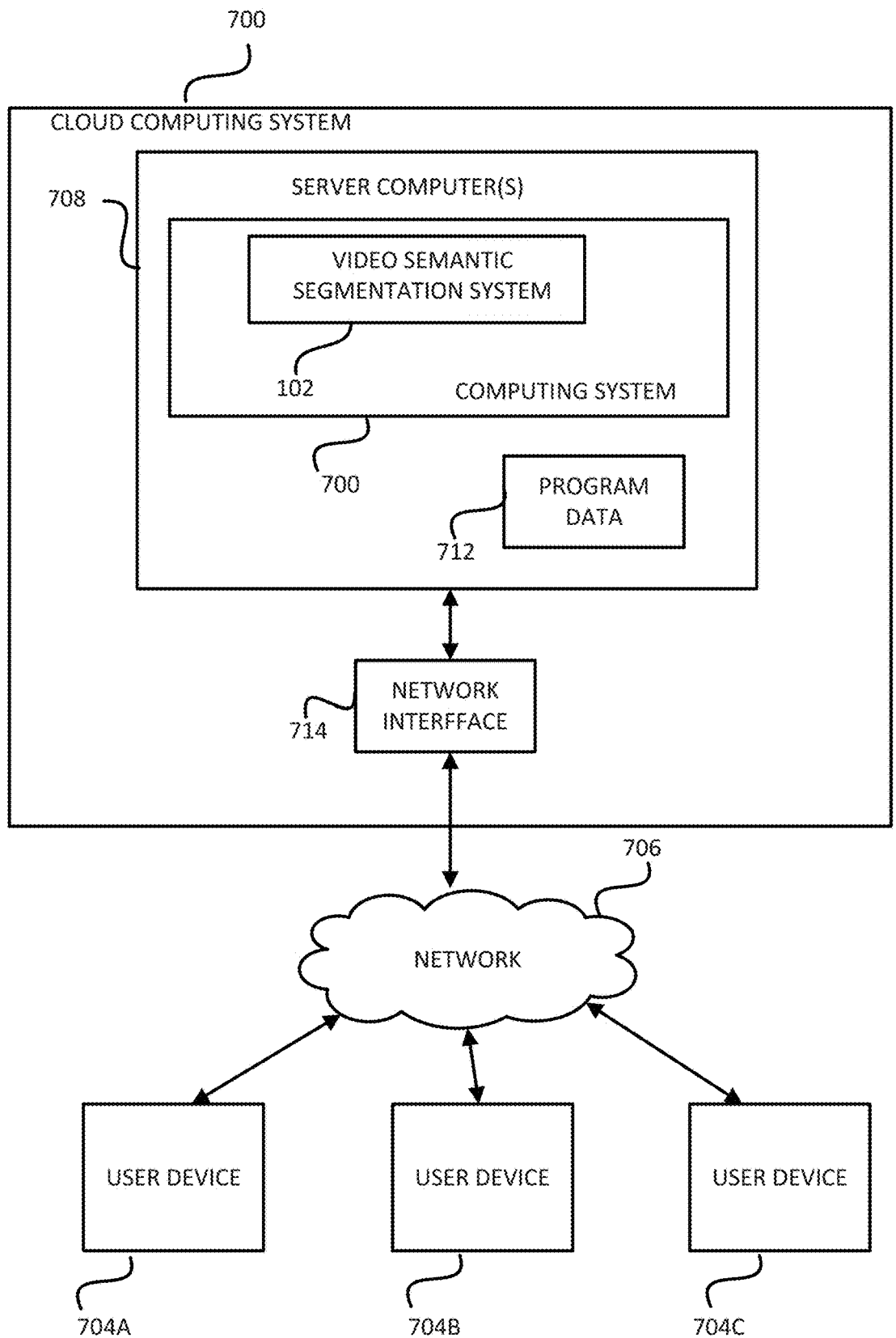
FIG. 7 depicts another example of a computing system that performs certain operations described herein, according to certain embodiments of the present disclosure.

In some embodiments, the functionality provided by VSSS 102 may be offered as cloud services by a cloud service provider. For example, FIG. 7 depicts an example of a cloud computing system 700 offering a video frame segmentation service that can be used by a number of user subscribers using user devices 704a, 704b, and 704c across a data network 706. In the example, the video frame segmentation service may be offered under a Software as a Service (SaaS) model. One or more users may subscribe to the VSSS service, and the cloud computing system 700 performs the processing to provide the VSSS service to subscribers. The cloud computing system 700 may include one or more remote server computers 708.

The remote server computers 708 include any suitable non-transitory computer-readable medium for storing program code 710 (e.g., VSSS 102) and program data 712, or both, which is used by the cloud computing system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 708 can include volatile memory, non-volatile memory, or a combination thereof.

One or more of the servers 708 execute the program code 710 that configures one or more processors of the server computers 708 to perform one or more of the operations that provide video frame segmenting services, including the ability to perform both fast and accurate video semantic segmentation using a set of temporally distributed neural networks. As depicted in the embodiment in FIG. 7, the one or more servers providing the services to generate segmented video frames may implement VSSS 102. Any other suitable systems or subsystems that perform one or more operations described herein (e.g., one or more development systems for configuring an interactive user interface) can also be implemented by the cloud computing system 700.

In certain embodiments, the cloud computing system 700 may implement the services by executing program code and/or using program data 712, which may be resident in a memory device of the server computers 708 or any suitable computer-readable medium and may be executed by the processors of the server computers 708 or any other suitable processor.

In some embodiments, the program data 712 includes one or more datasets and models described herein. Examples of these datasets include segmented video frames. In some embodiments, one or more of data sets, models, and functions are stored in the same memory device. In additional or alternative embodiments, one or more of the programs, data sets, models, and functions described herein are stored in different memory devices accessible via the data network 706.

The cloud computing system 700 also includes a network interface device 714 that enable communications to and from cloud computing system 700. In certain embodiments, the network interface device 714 includes any device or group of devices suitable for establishing a wired or wireless data connection to the data networks 706. Non-limiting examples of the network interface device 714 include an Ethernet network adapter, a modem, and/or the like. VSSS 102 is able to communicate with the user devices 704a, 704b, and 704c via the data network 706 using the network interface device 714.

General Considerations

Numerous specific details are set forth herein to provide a thorough understanding of the claimed subject matter. The claimed subject matter may be practiced without these specific details.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter.

The invention claimed is:

1. A method comprising:

extracting, from each video frame in a contiguous sequence of video frames, a group of features using one of a plurality of sub-neural networks, the contiguous sequence of video frames comprising a current video frame and one or more additional video frames occurring in the contiguous sequence prior to the current video frame, wherein the group of features extracted from the current video frame is different from another group of features extracted from the one or more additional video frames in the contiguous sequence of video frames;

generating a full feature representation for the current video frame by combining the groups of features extracted from the contiguous sequence of video frames, wherein generating the full feature representation for the current video frame comprises:

generating, for each video frame in the one or more additional video frames, an affinity value between pixels of the video frame in the one or more additional video frames and the current video frame; and generating the full feature representation for the current video frame based on the affinity value and the groups of features extracted from the contiguous sequence of video frames;

segmenting the current video frame based upon the full feature representation to generate a segmentation result, the segmentation result comprising information identifying, for a pixel in the current video frame, a label selected for the pixel based upon the full feature representation, wherein the label is selected from a plurality of labels; and outputting the segmentation result.

2. The method of claim 1, wherein the groups of features, extracted from the video frames in the contiguous sequence of video frames, together represent a total set of features used for segmenting the current video frame.

3. The method of claim 1, wherein the plurality of sub-neural networks comprises a first sub-neural network and a second sub-neural network, the first sub-neural network trained to extract a first group of features from a first video frame in the contiguous sequence of video frames, the second sub-neural network trained to extract a second group of features from a second video frame in the contiguous sequence of video frames, wherein the first video frame is different from the second video frame and the first group of features is different from the second group of features.

4. The method of claim 1, wherein extracting, from each video frame in the contiguous sequence of video frames, a group of features using a different one of the plurality of sub-neural networks comprises:
generating at least one of a value feature map, a query map, or a key map, wherein the value feature map comprises features extracted by a sub-neural network of the plurality of sub-neural networks from the video frame, and the query map and the key map comprise information related to correlations between pixels across the video frames or across adjacent video frames in the contiguous sequence.

5. The method of claim 1, wherein generating the full feature representation for the current video frame further comprises computing a correlation between pixels of a first video frame in the contiguous sequence and a second video frame in the contiguous sequence, where the first video frame is adjacent to the second video frame in the contiguous sequence and occurs before the second video frame in the contiguous sequence.

6. The method of claim 5, wherein generating the full feature representation for the current video frame further comprises:
(a) comparing the first video frame in the contiguous sequence with the second video frame in the contiguous sequence by computing an attention value between the pixels of the first video frame and the pixels of the second video frame, wherein the attention value measures the correlation between the pixels of the first video frame and the pixels of the second video frame;
(b) obtaining a value feature map of the first video frame and a value feature map of the second video frame; and
(c) updating the value feature map of the second video frame based on the attention value, the Value feature map of the first video frame and the value feature map of the second video frame.

7. The method of claim 1, further comprising:
(a) comparing a first video frame in the contiguous sequence with a second video frame in the contiguous sequence by computing an attention value between pixels of the first video frame and pixels of the second video frame, wherein the attention value measures a correlation between the pixels of the first video frame and the pixels of the second video frame;
(b) obtaining a value feature map of the first video frame and a value feature map of the second video frame;
(c) updating the value feature map of the second video frame based on the attention value, the value feature map of the first video frame and the value feature map of the second video frame;
(d) updating the contiguous sequence of video frames by removing the first video frame from the contiguous sequence of video frames; and
repeating (a), (b), (c) and (d) until only the current video frame is left in the contiguous sequence of video frames.

8. The method of claim 7, further comprising:
determining that only the current video frame is left in the contiguous sequence of video frames; and
based on the determining, outputting the value feature map for the current video frame, wherein the value feature map represents the full feature representation for the current video frame.

9. The method of claim 1, wherein the segmentation result comprises an image of the current video frame, wherein each pixel in the image of the current video frame is colored using a color corresponding to the label associated with the pixel.

10. The method of claim 1, a feature space representing a plurality of features to be used for segmenting video frames in the contiguous sequence of video frames is divided into a number of groups of features, wherein a number of sub-neural networks in the plurality of sub-neural networks is equal to a number of the groups of features.

11. The method of claim 10, wherein the number of groups of features is four.

12. The method of claim 1, wherein a number of layers in each sub-neural network from the plurality of sub-neural networks is the same.

13. The method of claim 12, wherein:
a number of layers in each sub-neural network from the plurality of sub-neural networks is the same; and
a number of nodes in each sub-neural network from the plurality of sub-neural networks is the same.

14. A system comprising:
a memory storing segmented video frames corresponding to a video signal; and
one or more processors configured to perform processing comprising:
extracting, from each video frame in a contiguous sequence of video frames, a group of features using one of a plurality of sub-neural networks, the contiguous sequence of video frames comprising a current video frame and one or more additional video frames occurring in the contiguous sequence prior to the current video frame, and wherein the group of features extracted from the current video frame is different from another group of features extracted from the one or more additional video frames in the contiguous sequence of video frames;
generating a full feature representation for the current video frame by combining the groups of features extracted from the contiguous sequence of video frames, wherein generating the full feature representation for the current video frame comprises:
generating, for each video frame in the one or more additional video frames, an affinity value between pixels of the video frame in the one or more additional video frames and the current video frame; and
generating the full feature representation for the current video frame based on the affinity value and the groups of features extracted from the contiguous sequence of video frames;
segmenting the current video frame based upon the full feature representation to generate a segmentation result, the segmentation result comprising information identifying, for a pixel in the current video frame, a label selected for the pixel based upon the full feature representation, wherein the label is selected from a plurality of labels; and outputting the segmentation result.

15. The system of claim 14, wherein the groups of features, extracted from the video frames in the contiguous sequence of video frames, together represent a total set of features used for segmenting the current video frame.

16. The system of claim 14, wherein the plurality of sub-neural networks comprises a first sub-neural network and a second sub-neural network, the first sub-neural network trained to extract a first group of features from a first video frame in the contiguous sequence of video frames, the second sub-neural network trained to extract a second group of features from a second video frame in the contiguous sequence of video frames, wherein the first video frame is different from the second video frame and the first group of features is different from the second group of features.

17. A non-transitory computer-readable medium having program code that is stored thereon, the program code executable by one or more processing devices for performing operations comprising:

extracting, from each video frame in a contiguous sequence of video frames, a group of features using one of a plurality of sub-neural networks, the contiguous sequence of video frames comprising a current video frame and one or more additional video frames occurring in the contiguous sequence prior to the current video frame, and wherein the group of features extracted from the current video frame is different from another group of features extracted from the one or more additional video frames in the contiguous sequence of video frames;

generating a full feature representation for the current video frame based upon the groups of features extracted from the contiguous sequence of video frames, wherein generating the full feature representation comprises computing a correlation between pixels of a first video frame in the contiguous sequence and a second video frame in the contiguous sequence, where the first video frame is adjacent to the second video frame in the contiguous sequence and occurs before the second video frame in the contiguous sequence;

segmenting the current video frame based upon the full feature representation to generate a segmentation result, the segmentation result comprising information identifying, for a pixel in the current video frame, a label selected for the pixel based upon the full feature representation, wherein the label is selected from a plurality of labels; and outputting the segmentation result.

* * * * *